US005900614A

United States Patent [19]

Nakakawaji et al.

[11] Patent Number: 5,900,614

[45] Date of Patent: May 4, 1999

[54] SELF-SCANNING CHECKOUT DEVICE

[75] Inventors: Mikio Nakakawaji; Shinji Hasegawa, both of Shizuoka-ken; Kazuyuki Matsumura, Numazu, all of Japan

[73] Assignee: Kabushiki Kaisha TEC, Shizuoka, Japan

[21] Appl. No.: 08/863,179

[22] Filed: May 27, 1997

Related U.S. Application Data

[63] Continuation of application No. 08/328,107, Oct. 24, 1994, abandoned.

[30] Foreign Application Priority Data

| | | | |
|---|---|---|---|
| Oct. 25, 1993 | [JP] | Japan | 5-266373 |
| Jan. 21, 1994 | [JP] | Japan | 6-005417 |
| Jan. 24, 1994 | [JP] | Japan | 6-005925 |
| Apr. 28, 1994 | [JP] | Japan | 6-092619 |

[51] Int. Cl.[6] .......... G06K 07/10

[52] U.S. Cl. .......... 235/462.14; 235/462.3; 235/462.31; 235/462.43

[58] Field of Search .......... 235/383, 385, 235/462, 454, 462.14, 462.3, 462.31, 462.43

[56] References Cited

U.S. PATENT DOCUMENTS

| | | | |
|---|---|---|---|
| 3,836,755 | 9/1974 | Ehrat | 235/383 |
| 4,071,740 | 1/1978 | Gogulski | 235/431 |
| 4,676,343 | 6/1987 | Humble et al. | 235/383 X |
| 4,679,154 | 7/1987 | Blanford | 235/383 X |
| 4,787,467 | 11/1988 | Johnson | 235/383 |
| 4,792,018 | 12/1988 | Humble et al. | 235/383 X |
| 4,929,819 | 5/1990 | Collins, Jr. | 235/383 |
| 4,964,053 | 10/1990 | Humble | 235/383 X |
| 5,340,970 | 8/1994 | Wolfe, Jr. et al. | 235/383 |
| 5,343,025 | 8/1994 | Usui | 235/383 |
| 5,375,680 | 12/1994 | Ikeda et al. | 235/383 X |
| 5,418,354 | 5/1995 | Halling et al. | 235/383 |
| 5,426,282 | 6/1995 | Humble | 235/383 |

FOREIGN PATENT DOCUMENTS 61-46591 3/1996 Japan .

*Primary Examiner*—Anita Pellman Gross
*Assistant Examiner*—Douglas X. Rodriguez
*Attorney, Agent, or Firm*—Frishauf, Holtz, Goodman, Langer & Chick

[57] ABSTRACT

A self-scanning checkout device includes a registration section having a stationary scanner for permitting a customer to input article information for a purchased article, a counter arranged on the downstream side from the registration section in the article moving direction, for receiving a purchased article which has been registered thereon, and a monitoring section for monitoring a movement of the purchased article. The monitoring section sets an article registration flag when information of the purchased article is read by the stationary scanner, checks the article registration flag when the passage of an article is detected by article sensors disposed near and on the downstream side from the reading position of the stationary scanner, resets the article registration flag when the article registration flag is detected to be set, and issues an alarm indicating the passage of an unregistered article when the article registration flag is detected to be reset.

18 Claims, 25 Drawing Sheets

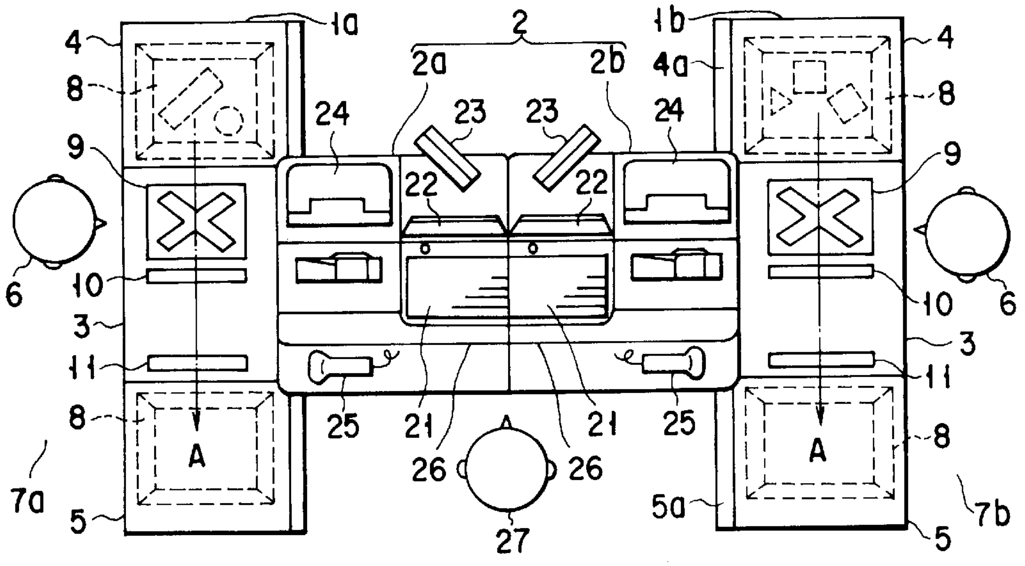
FIG. 1
FIG. 3A
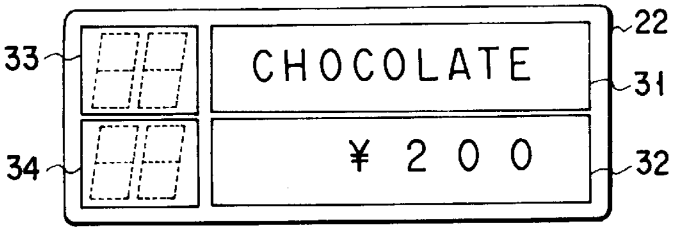
FIG. 3B
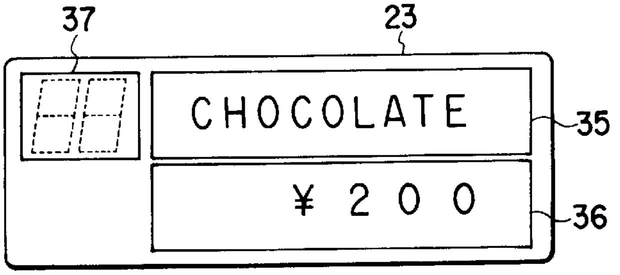
FIG. 4
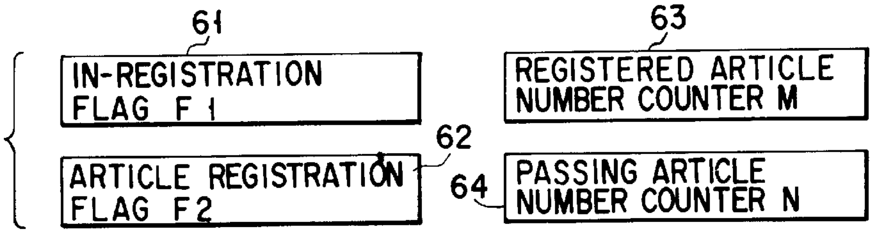

SELF-SCANNING CHECKOUT DEVICE

This application is a Continuation of application Ser. No. 08/328,107, filed Oct. 24, 1994, now abandoned.

BACKGROUND OF THE INVENTION

1. Field of the Invention

This invention relates to a self-scanning checkout device with which a customer himself scans and registers purchased articles.

2. Description of the Related Art

A conventional self-scanning checkout device has a registering section, a carrying-in/weighing section, a carrying-out section, and a settlement section. The registering section includes a stationary scanner, the carrying-in/weighing section includes a carrying-in conveyor and a weighing unit, and the carrying-out section includes a carrying-out conveyor. The registering section, a carrying-in/weighing section, and a carrying-out section are arranged in this order along the flow of articles. The settlement section is constructed by an electronic cash register and disposed near the carrying-in/weighing section and carrying-out section. This checkout device is disclosed in Jpn. Pat. Appln. KOKAI Publication No. 61-46591, for example.

In the above device, a customer himself passes purchased articles one at a time on the reading surface of the stationary scanner to read the article code (bar code) thereof and sets the articles on the carrying-in conveyer of the carrying-in/weighing section. Then, the article code read by the scanner is transmitted to the settlement section and real weight data of the article weighed by the weighing unit is transmitted to the settlement section. As a result, in the settlement section, article weight data previously set for the article code is compared with the real weight data to determine whether two weight data items substantially coincide with each other or not. When it is determined that the two weight data items substantially coincide with each other, sales data of the article is registered in the settlement section and the article is carried out from the carrying-out section via the carrying-in conveyer and carrying-out conveyer.

When the scanning registration for all of the purchased articles by the customer is completed, the total amount of the purchased articles is output from the settlement section. Therefore, the cashier is only required to effect the settlement service in the settlement section. Then, the customer puts the carried-out articles from the carrying-out section into a bag.

In the case of self-scanning system, since the customer himself operates the stationary scanner to scan and register the purchased articles, it becomes important to prevent an erroneous operation caused by misunderstanding that the article is registered even when the article code cannot be correctly read by the scanner or a dishonest act for intentionally effecting incorrect registration.

Conventionally, the above-described erroneous operation and dishonest act are prevented by comparing the real weight of the registered article and the preset weight thereof with each other. However, in this case, a weighing unit for measuring the article weight is necessary, thereby increasing the installation cost and increasing the size of the device, and it is also necessary to previously store and manage preset weight information of each article, thereby making information management complicated.

SUMMARY OF THE INVENTION

An object of this invention is to provide a self-scanning checkout device which can reduce the size and installation cost without complicated information management to obtain simple construction and high practicability.

In order to attain the above object, according to a first aspect of this invention, there is provided a self-scanning checkout device comprising an input section having an article information reading unit for permitting a customer to input article information for a purchased article; a registered article placing section arranged on the downstream side from the input section in the article moving direction, for receiving a purchased article which has been registered thereon; a settlement section disposed on the opposite side of a path for customers with the input section disposed therebetween, for processing the article information read by the article information reading unit to register sales data of the purchased article; and monitoring means for monitoring a movement of the purchased article; wherein the monitoring means includes storing means for storing an article registration flag; article registration flag setting means for setting the article registration flag when information of the purchased article is read by the article information reading unit; a downstream side article sensor disposed near and on the downstream side from the reading position of the article information reading unit of the input section; article registration flag checking means for checking the article registration flag when the passage of an article is detected by the downstream side article sensor; article registration flag resetting means for resetting the article registration flag when the article registration flag checking means determines that the article registration flag is set; and unregistered article passage alarming means for issuing an alarm indicating the passage of an unregistered article when the article registration flag checking means determines that the article registration flag is reset.

Further, according to a second aspect of this invention, there is provided a self-scanning checkout device in which the monitoring means is constructed such that a plurality of downstream side article sensors are arranged along the article moving direction, the article registration flag is checked when the passage of an article is sequentially detected by the downstream side article sensors in an order from the uppermost stream side sensor towards the downstream side sensor with respect to the article moving direction, the article registration flag is reset when it is determined that the article registration flag is set, and an alarm for the passage of an unregistered article is issued when it is determined that the article registration flag is reset.

Further, according to a third aspect of this invention, there is provided a self-scanning checkout device in which the monitoring means further includes registered article counting means for counting the number of information readings of the purchased articles effected by the article information reading unit; passing article counting means for counting the number of times of detection of passages of articles by the plurality of article sensors; and count display means for displaying the counts of both of the counting means on the real time base.

The count display means may preferably display the registered article counting number and passing article counting number on a display unit for the cashier who operates the settlement section and display only the registered article counting number on a display unit for the customer on the customer's path side.

Further, according to a fourth aspect of this invention, there is provided a self-scanning checkout device which comprises an input section; settlement section; an unregistered article placing section arranged on the upstream side from the input section in the article moving direction, for receiving a purchased article which is not yet registered thereon; and monitoring means for monitoring a movement of an article; wherein the monitoring means includes storing means for storing an article extraction flag; article extraction flag resetting means for resetting the article extraction flag when information of the purchased article is read by the article information reading unit; an upstream side article sensor disposed on the upstream side from the reading position of the article information reading unit of the input section; article extraction flag checking means for checking the article extraction flag when the passage of an article is detected by the upstream side article sensor; article extraction flag setting means for setting the article extraction flag when the article extraction flag checking means determines that the article extraction flag is reset; and unregistered article extraction alarming means for issuing an alarm indicating that an article which is previously extracted from the unregistered article placing section is not yet registered when the article extraction flag checking means determines that the article extraction flag is set.

Further, according to a fifth aspect of this invention, there is provided a self-scanning checkout device which comprises an input section; a settlement section; a unregistered article placing section; a registered article placing section arranged on the downstream side from the input section in the article moving direction, for receiving a purchased article which has been registered thereon; and monitoring means for monitoring a movement of the purchased article; wherein the monitoring means includes storing means for storing an article registration flag; article registration flag setting means for setting the article registration flag when information of the purchased article is read by the article information reading unit; a downstream side article sensor disposed on the downstream side from the reading position of the article information reading unit of the input section; article registration flag resetting means for resetting the article registration flag when the downstream side article sensor detects the passage of an article; an upstream side article sensor disposed on the upstream side from the reading position of the article information reading unit of the input section; article registration flag checking means for checking the article registration flag when the passage of an article is detected by the upstream side article sensor; and unregistered article extraction alarming means for issuing an alarm indicating that an article which is previously extracted from the unregistered article placing section is not yet registered when the article registration flag checking means determines that the article registration flag is set.

In the device according to the first aspect of this invention, a customer himself effects the scanning and registration operation by repeatedly effecting the operation of placing an article on the registered article placing section on the downstream side after passing purchased articles which are not yet registered one at a time through the reading position of the article information reading unit on the customer's path side of the input section.

In this case, the passage of an article (or a customer's hand holding the article) is detected by the downstream side article sensor before the article which has passed the reading position of the article information reading unit is placed on the registered article placing section. At this time, if the article registration flag is set, the flag is reset, and if the flag is reset, an alarm indicating that the article is not registered is issued.

The article registration flag is set when information of the purchased article is read by the article information reading unit. Therefore, when an article whose article information is not read even if the scanning operation is effected is fed to the registered article placing section, the alarm is issued.

Further, in the device according to the second aspect of this invention, the scanning and registration operation by the customer himself is substantially the same as in the former case. In the case of this device, when the passage of an article is sequentially detected by a plurality of downstream side article sensors arranged on the downstream side from the reading position of the article information reading unit in the article moving direction in an order from the uppermost stream side sensor towards the downstream side sensor with respect to the article moving direction, the article registration flag is checked. Therefore, when an article whose article information is not read even if the scanning operation is effected is fed to the registered article placing section, the alarm is issued.

Further, in the device according to the third aspect of this invention, the number of times of information readings of purchased articles effected by the article information reading unit is counted, the number of times of detection of passages of articles by the plurality of article sensors, and the number of article registrations and the number of passages of articles are displayed on the real time base.

Further, in the devices according to the fourth and fifth aspects of this invention, the scanning and registration operation by the customer himself is substantially the same as in the former case. In the case of these devices, the passage of an article (or a customer's hand holding the article) is detected by the upstream side article sensor before the article extracted from the unregistered article placing section passes the reading position of the article information reading unit in the input section.

In this case, in the device according to the fourth aspect of this invention, if the article extraction flag is reset, the flag is set, and if the flag is set, an alarm indicating that the previously scanned article is not registered is issued.

The article extraction flag is reset when information of the purchased article is read by the article information reading unit. Therefore, if an attempt is made to scan a next article although information of an article which is previously subjected to the scanning operation is not read, the alarm is issued.

In the device according to the fifth aspect of this invention, an alarm indicating that a previously scanned article is not registered is issued if the article registration flag is set when the passage of an article is detected by the upstream side article sensor.

The article registration flag is set when information of the purchased article is read by the article information reading unit and the article registration flag is reset when the passage of an article is detected by the downstream side article sensor which is disposed near and on the downstream side from the reading position of the article information reading unit in the input section. Therefore, if an attempt is made to scan a next article although information of an article which is previously subjected to the scanning operation is not read, the alarm is issued.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view showing the whole construction of a self-scanning checkout device according to a first embodiment of this invention;

FIGS. 3A and 3B are plan views showing the construction of display units shown in FIG. 1;

FIG. 4 is a diagram showing main memory areas provided in a RAM shown in FIG. 2;

DETAILED DESCRIPTION OF THE PREFERRED EMBODIMENTS

Figure 2:
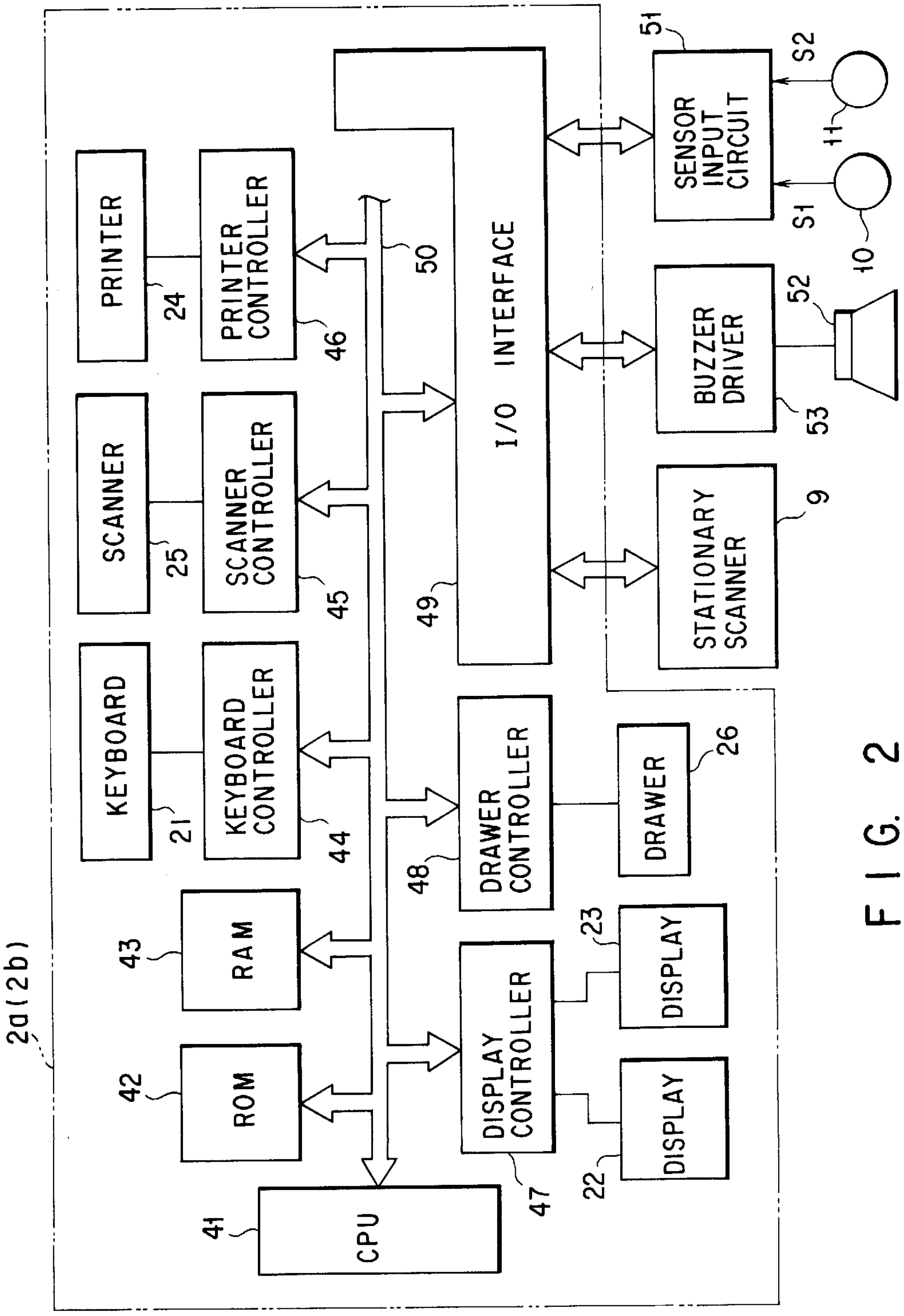
FIG. 2 is a block diagram showing the construction of a control circuit for the checkout device shown in FIG. 1.

There will now be described a self-scanning checkout device according to a first embodiment of this invention with reference to FIGS. 1 to 5.

FIG. 1 shows the whole construction of the self-scanning checkout device. This checkout device is of a two-lane type in which two checkout counters 1*a*, 1*b* are arranged in parallel and a settlement section 2 having two electronic cash registers (which are hereinafter referred to as ECRs) 2*a*, 2*b* is disposed between the checkout counters.

Each of the checkout counters 1*a*, 1*b* has a first counter 4 used as an unregistered article placing section on which unregistered purchased articles are placed and disposed on the upstream side of the article moving direction (direction indicated by an arrow A in FIG. 1) and a second counter 5 used as a registered article placing section on which registered purchased articles are placed and disposed on the downstream side with a registering section (input section) 3 disposed between the first and second counters. Customer's paths (checkout lanes) 7*a*, 7*b* along which customers walk are created outside the checkout counters 1*a*, 1*b*.

The first and second counters 4 and 5 are formed lower than the registering section 3, and when a shopping basket 8 provided in the store is placed on the counter 4 or 5, the upper level of the basket 8 is substantially aligned with the top surface of the registering section 3. Further, side plates 4*a*, 5*a* are provided on the internal sides of the counters 4, 5 so as to prevent the basket 8 from falling on the settlement section 2.

In the registering section 3, stationary scanners 9 used as article information reading means for optically reading a bar code affixed to an article are buried near the first counters 4 of the respective counters 1*a*, 1*b*. Further, two downstream side article sensors 10, 11 (which are hereinafter referred to as first article sensor 10 and second article sensor 11) are fixed in substantially the same plane as the reading surface of the stationary scanner 9 and on the downstream side from the reading surface along the article moving direction A.

The sensors 10, 11 are of a light reflection type and generate sensor-ON signals when an article passes a position directly above the sensors. For example, the first article sensor 10 is fixed near the stationary scanner 9 between the stationary scanner 9 and the second counter 5, and the second article sensor 11 is fixed near the second counter 5 between the stationary scanner 9 and the second counter 5.

Each of the ECRs 2*a*, 2*b* constructing the settlement section 2 includes a keyboard 21, cashier display unit 22, customer display unit 23, receipt/journal printer 24, touch scanner 25 and drawer 26, and one cashier 27 operates two ECRs.

The keyboard 21 is a keyboard exclusively used for the ECR and having ten keys for inputting an amount of money deposited from the customer and registration service keys such as a total key provided for respective cash payment methods As shown in FIG. 3A, the cashier display unit 22 includes an article name display section 31 for displaying the name of sales article or the like, an amount display section 32 for displaying the price of sales article and the total amount of one transaction and the like, a registered article number display section 33 for displaying the number of articles scanned and registered in one transaction, and a passing article number display section 34 for displaying the number of times of passage of articles detected by the article sensors 10, 11 in a period of one transaction As shown in FIG. 3B, the customer display unit 23 includes an article name display section 35, amount display section 36 and registered article number display section 37 and the passing article number display section is omitted FIG. 2 shows the construction of a control circuit for one lane in the self-scanning checkout device. The ECR 2*a* (2*b*) includes a CPU (central processing unit) 41 constructing the main body of the control section, a ROM (read only memory) 42 in which fixed data such as programs executed by the CPU 41 is previously stored, a RAM (random access memory) 43 in which a sales registration file used for registering article sales data, a work area used for various arithmetic operations and the like are formed, a keyboard controller 44 for controlling the keyboard 21, a scanner controller 45 for controlling the touch scanner 25, a printer controller 46 for controlling the receipt/journal printer 24, a display controller 47 for controlling the cashier and user display units 22, 23, a drawer controller 48 for controlling the opening/closing operation of the drawer 26, and an input/output interface 49, and the above units are connected via a bus line 50.

The input/output interface 49 is connected to the stationary scanner 9 of the registering section 3, a sensor input circuit 51 for receiving signals S1, S2 output from the first and second article sensors 10, 11 and a buzzer driving circuit 53 for activating an alarming buzzer 52.

As is specifically shown in FIG. 4, in the RAM 43, flag memories 61, 62 for an in-registration flag F1 and article registration flag F2 and counter memories 63, 64 for a registered article number counter M and passing article number counter N are formed.

The in-registration flag F1 is set to "1" when registration of articles purchased by one customer is started and is reset to "0" when the registration of all of the articles is completed. The article registration flag F2 is set when the scanning and registering operation for one article is effected and it is reset when the article is fed to the second counter 5. The flag memory 62 constructs storing means for storing the article registration flag.

The registered article number counter M counts the number of articles scanned and registered in one transaction and constructs registered article number counting means. The passing article number counter N counts the number of times of detection of passage of articles by the article sensors 10, 11 in a period of one transaction and constructs passing article number counting means.

Figure 5A:
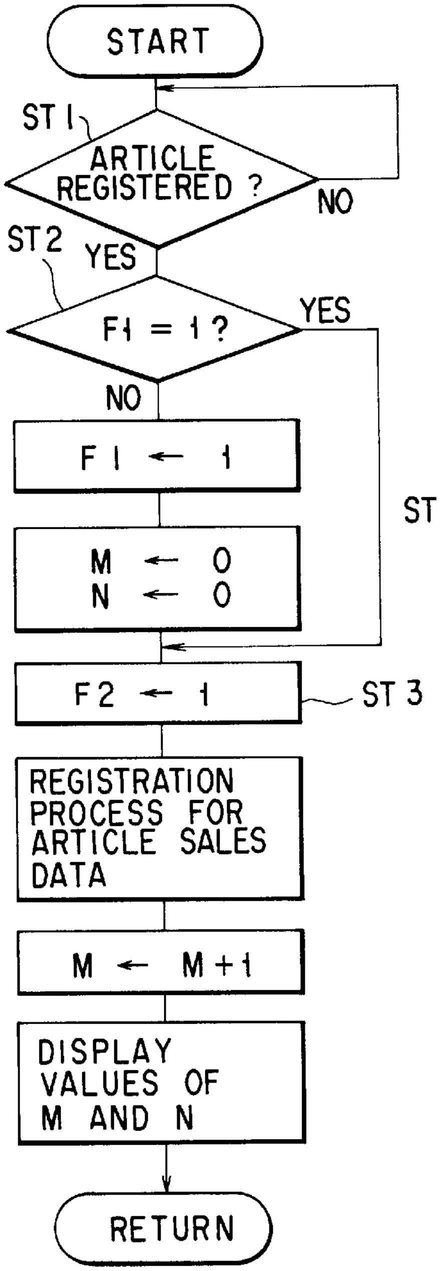
FIGS. 5A and 5B are flowcharts showing the main processes performed by a CPU shown in FIG. 2.
Figure 5B:
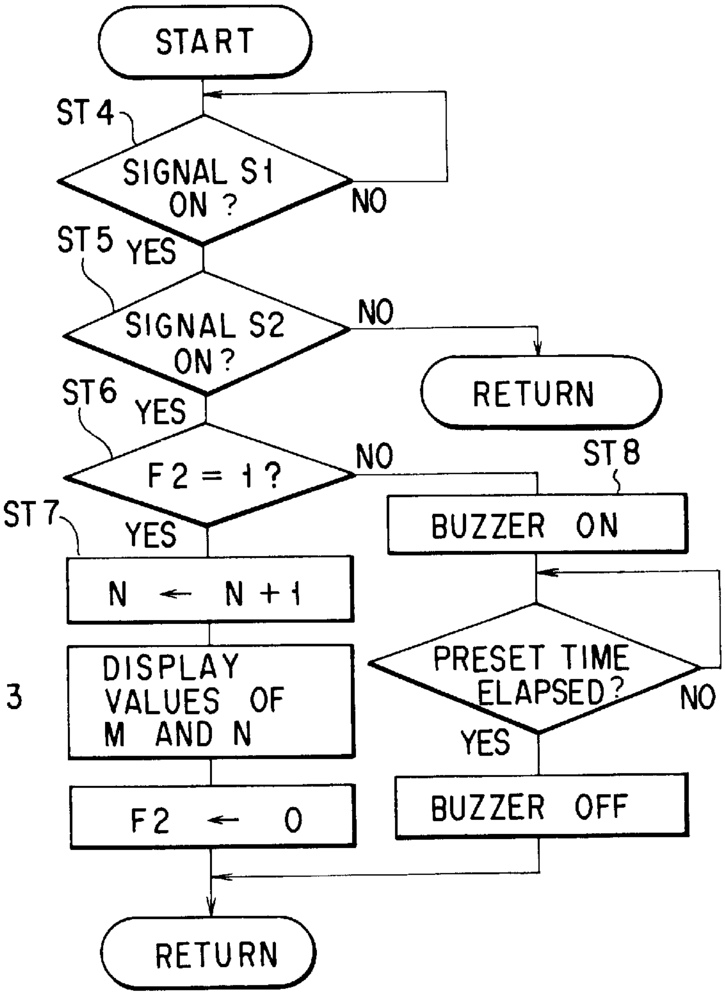

The CPU 41 is controlled by the program so as to perform both of the processes shown in FIGS. 5A, 5B.

That is, as shown in FIG. 5A, the CPU 41 is set in the standby state as the step ST1 to wait for execution of the article registering operation. Then, if a bar code affixed to the article is read by the stationary scanner 9 and bar code data is input via the input/output interface 49, the CPU determines that the article registering operation is effected and checks the in-registration flag F1 as the step ST2. At this time, if the in-registration flag F1 is reset to "0", it is determined that the registering operation is the first registering operation for an article purchased by one customer, the in-registration flag F1 is set to "1" and the registered article number counter M and passing article number counter N are cleared to "0". When the in-registration flag F1 is already set, the registering operation is a second or succeeding registering operation and the above process is not effected.

Next, the CPU 41 sets the article registration flag F2 to "1" as the step ST3 (article registration flag setting means).

Further, an ordinary article sales data registering process is effected. More specifically, sales data of the sales article is obtained based on the bar code read by the stationary scanner 9 and registered in the sales registration file of the RAM 43. Further, the name and amount of sales article are displayed on the display sections 31, 32 of the cashier display unit 22 and on the display sections 35, 36 of the customer display unit 23. Further, the name and unit price of the sales article, the number of sold articles, the amount thereof and the like are printed and output on the receipt paper and journal paper by the printer 24.

Next, the CPU 41 counts up the registered article number counter M by +1. Then, the CPU 41 causes the display section 33 of the cashier display unit 22 and the display section 37 of the customer display unit 23 to display the count of the registered article number counter M and causes the display section 34 of the cashier display unit 22 to continuously display the count of the passing article number counter N (count display means). After this, the operation is returned to the start of the process.

Further, as shown in FIG. 5B, the CPU 41 waits for the first article sensor 10 to detect an article which passes a position directly above the sensor as the step ST4. When a sensor-ON signal Si is input from the first article sensor 10 and the passage of an article is detected, it waits for the second sensor 11 to detect the passage of the article directly above the sensor as the step ST5. When a sensor-ON signal S2 is input from the second sensor 11 in a period corresponding to the time necessary and sufficiently long for the customer to move the hand holding the article from the position of the first sensor 10 to the position of the second sensor 11 and the passage of the article is detected, it checks the article registration flag F2 as the step ST6 (article registration flag checking means)

At this time, if the flag F2 is set, it can be determined that an article whose bar code is read by the stationary scanner 9 has passed above the first article sensor 10 and has passed above the second article sensor 11, that is, the article has moved towards the downstream side, and therefore, the count of the passing article number counter N is counted up by +1 as the step ST7. Then, the count of the passing article number counter N is displayed on the display section 34 of the cashier display unit 22, and at the same time, the count of the registered article number counter M is kept displayed on the display section 33 of the cashier display unit 22 and the display section 37 of the customer display unit 23 (count display means). After this, the article registration flag F2 is reset to "0" (article registration flag resetting means). Then, the operation is returned to the start of the process.

If the article registration flag F2 is reset in the step ST6, it can be determined that an article whose bar code is not read by the stationary scanner 9 has passed above the first article sensor 10 and has passed above the second article sensor 11, and therefore, a buzzer-ON signal is supplied to the buzzer driving circuit 53 via the input/output interface 49 for a preset period of time as the step ST8 (unregistered article passage alarming means).

Then, after the signal is supplied for the preset period of time, supply of the buzzer-ON signal is interrupted and the operation is returned to the start of the process.

If the passage of an article is not detected by the second article sensor 11 in the preset period of time in the step ST5, it can be determined that an article which has passed above the first article sensor 10 is not an article which has been subjected to the bar code reading operation nor a hand holding the article, and therefore, the operation is returned to the start of the process.

In the self-scanning checkout device according to the first embodiment thus constructed, the customer puts articles to be purchased or the shopping basket 8 having articles contained therein on the first counter 4, holds the articles by hand one at a time, and then moves the articles one by one from the first counter 4 to the second counter 5 with the bar code portion thereof set to face the reading surface of the stationary scanner 9.

Then, the bar code of the article is read by the stationary scanner 9 and the movement of the article (or a hand holding the article) is detected by the first article sensor 10 and the second article sensor 11 in this order so that the counts of the registered article number counter M and passing article number counter N will be respectively counted up by +1 by the programmed process shown in FIGS. 5A and 5B. Further, sales date of the article is registered based on the bar code read by the stationary scanner 9.

On the other hand, if the bar code portion is not set to face the reading surface and the article is moved to the second counter 5 while the bar code is not read by the stationary scanner 9, the buzzer 52 is energized for a preset period of time to call customer's and cashier's attentions.

Thus, since the customer notices that the bar code was not correctly read and an operation error has occurred, he will effect the article registration again. The cashier 27 may confirm that the customer starts the article registration when the cashier heard the buzzer sound. As a result, dishonest acts that the customer intentionally makes an erroneous bar code reading and the customer will not start the article registration again can be easily found by the cashier 27 and can be prevented.

It is possible for the customer to do a dishonest act by moving the article on the first counter 4 to the second counter 5 without passing the article above the registering section 3, but such a dishonest act can be easily found by the cashier 27 by simply observing the behavior of the customer and no serious problem occurs.

Thus, according to the first embodiment, a highly reliable self-scanning checkout device can be realized which can prevent a dishonest act of the customer for intentionally effecting incorrect registration and an operation mistake by the customer who misunderstands that the article is correctly scanned and registered even though the bar code thereof is not read by the scanner 9 with a simple construction obtained by arranging the two article sensors 10, 11 on the downstream side from the stationary scanner 9 along the article moving direction. Therefore, in comparison with the conventional system using the weight comparison, the weighing unit and carrier conveyer can be omitted, thereby making it possible to lower the installation cost and reducing the installation space.

Further, since it is not necessary to manage special article information such as weight information, no trouble occurs in the management of information.

In addition, in the first embodiment, whether the bar code is read or not is determined when an article passes above the first article sensor 10 and then passes above the second article sensor 11 in a preset period of time, and only when it is determined that the bar code is not read, an alarm is issued by the buzzer sound.

The hand carrying the article to the second counter 5 is sometimes moved above the registering section 3 in a direction opposite to the article moving direction A when the hand is moved back to the first counter 4, and in this case, the passage of the article is detected by the second article sensor 11 and the first article sensor 10 in this order while the bar code reading is not effected, but at this time, the buzzer 52 is not energized and no alarm is issued.

Further, in the first embodiment, the number of articles registered by scanning by one customer and the number of articles passing above the first and second article sensors 10, 11 are respectively counted by the counters M and N and the counts thereof are displayed and output on the cashier display unit 22 on the real time base.

Therefore, the cashier can determine that the registration is correctly effected when the counts are equal to each other. If the registered article number becomes larger than the passing article number, it can be determined that an operation mistake of double registration has occurred.

Further, since the registered article number is displayed on the customer display unit 23, the customer can easily check the correctness of the self-registration and the omission of the registration based on the displayed number and the number of articles which are actually moved to the second counter 5.

In the first embodiment, the two article sensors 10, 11 are arranged on the downstream side from the stationary scanner 9 along the article moving direction, but the same effect can be attained by sequentially arranging three or more article sensors along the article moving direction, determining whether the bar code reading by the stationary scanner 9 is effected or not only when the passage of the article is sequentially detected by the article sensors in an order from the uppermost stream side in the article moving direction, counting up the passing article number when it is determined that the bar code reading is effected, and issuing an alarm when it is determined that the bar code reading is not effected.

Figure 6:
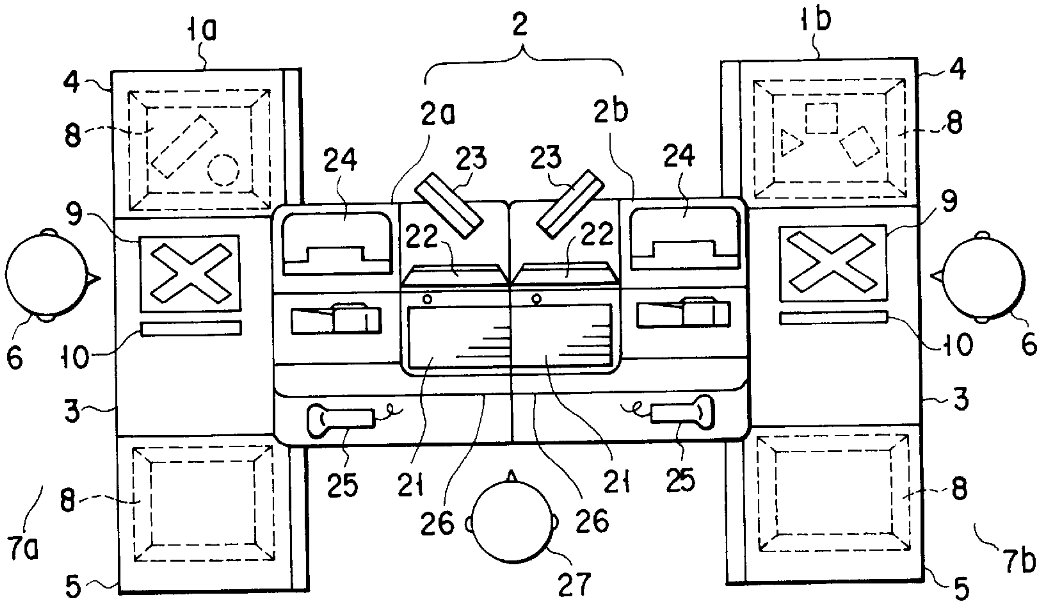
FIG. 6 is a plan view showing the whole construction of a modification of the checkout device shown in FIG. 1.
Figure 7:
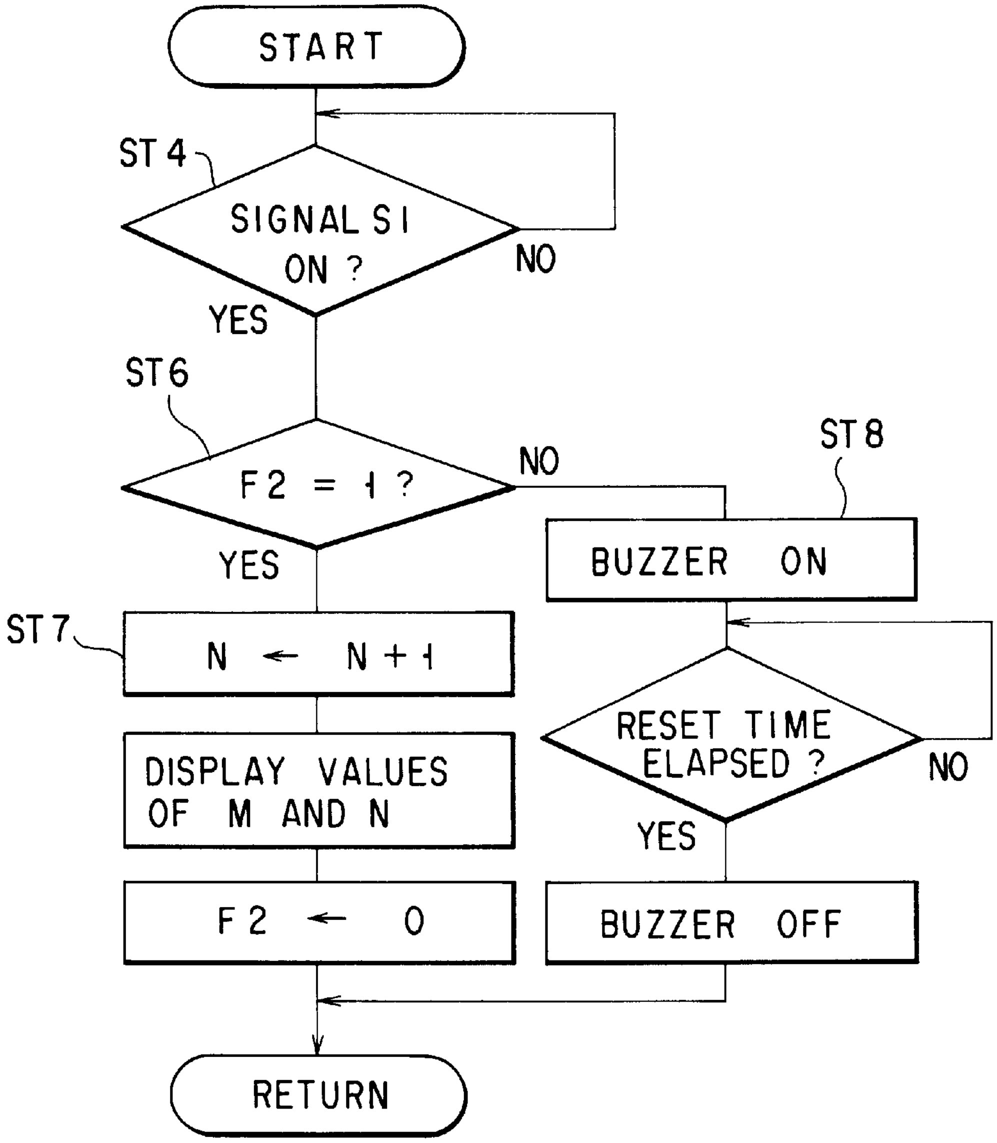
FIG. 7 is a flowchart showing the main process performed by a CPU in the modification shown in FIG. 6.

Further, also in a case where the article sensor 10 is arranged only near and on the downstream side from the stationary scanner 9 as shown in FIG. 6, whether or not the bar code reading by the stationary scanner 9 is effected is determined (ST6) when the passage of an article is detected by the article sensor 10 ("YES" in ST1) as shown in FIG. 7, the passing article number is counted up (ST7) when the bar code reading is effected, and an alarm is issued (ST8) when the bar code reading is not effected, the system can be sufficiently practically used as a simple self-scanning checkout device although there is a possibility that an alarm will be erroneously issued when the hand carrying the article to the second counter 5 is moved back to the first counter 4.

Next, a self-scanning checkout device according to a second embodiment of this invention is explained with reference to FIGS. 8 to 12. Portions which are substantially the same as those of the first embodiment are denoted by the same reference numerals and the detail explanation therefor is omitted.

Figure 8:
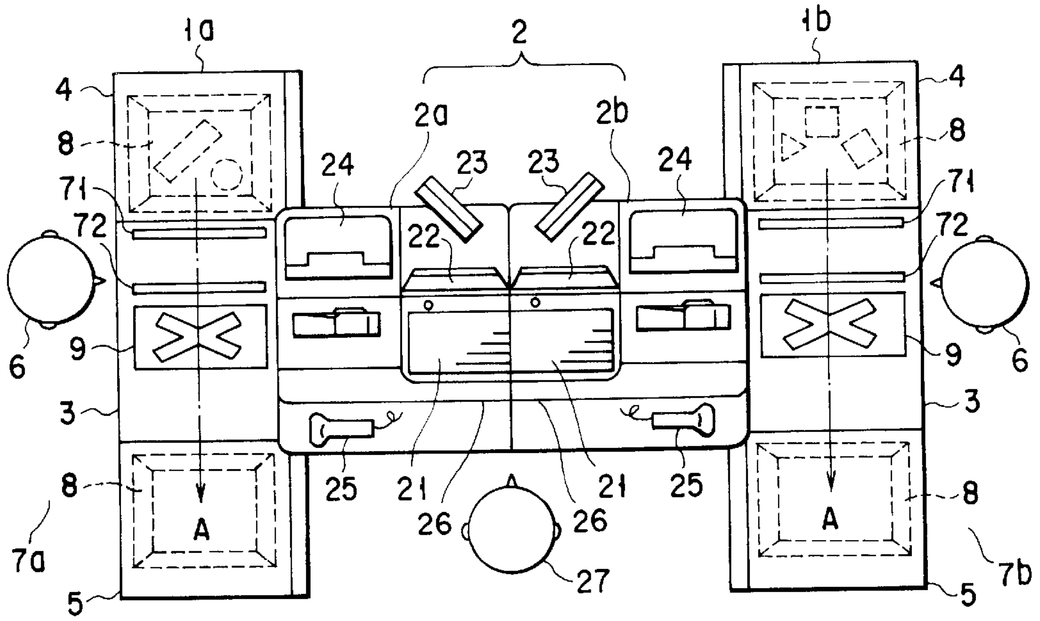
FIG. 8 is a plan view showing the whole construction of a self-scanning checkout device according to a second embodiment of this invention.

FIG. 8 shows the whole construction of the self-scanning checkout device. The second embodiment is similar to the first embodiment except that two upstream side article sensors 71, 72 (which are hereinafter referred to as a third article sensor 71 and fourth article sensor 72) are fixed on the upstream side from the stationary scanner 9 used as article information reading means in the registering section (input section) 3 along the article moving direction A and the downstream side article sensors 10, 11 are omitted.

Like the downstream side article sensors 10, 11, the upstream side article sensors 71, 72 are also light reflection type sensors and each generate a sensor-ON signal when an article passes directly above the sensor. The third article sensor 71 is fixed near the first counter 4 between the first counter 4 and the stationary scanner 9 and the fourth article sensor 72 is fixed near the stationary scanner 9 between the first counter 4 and the stationary scanner 9.

Figure 9:
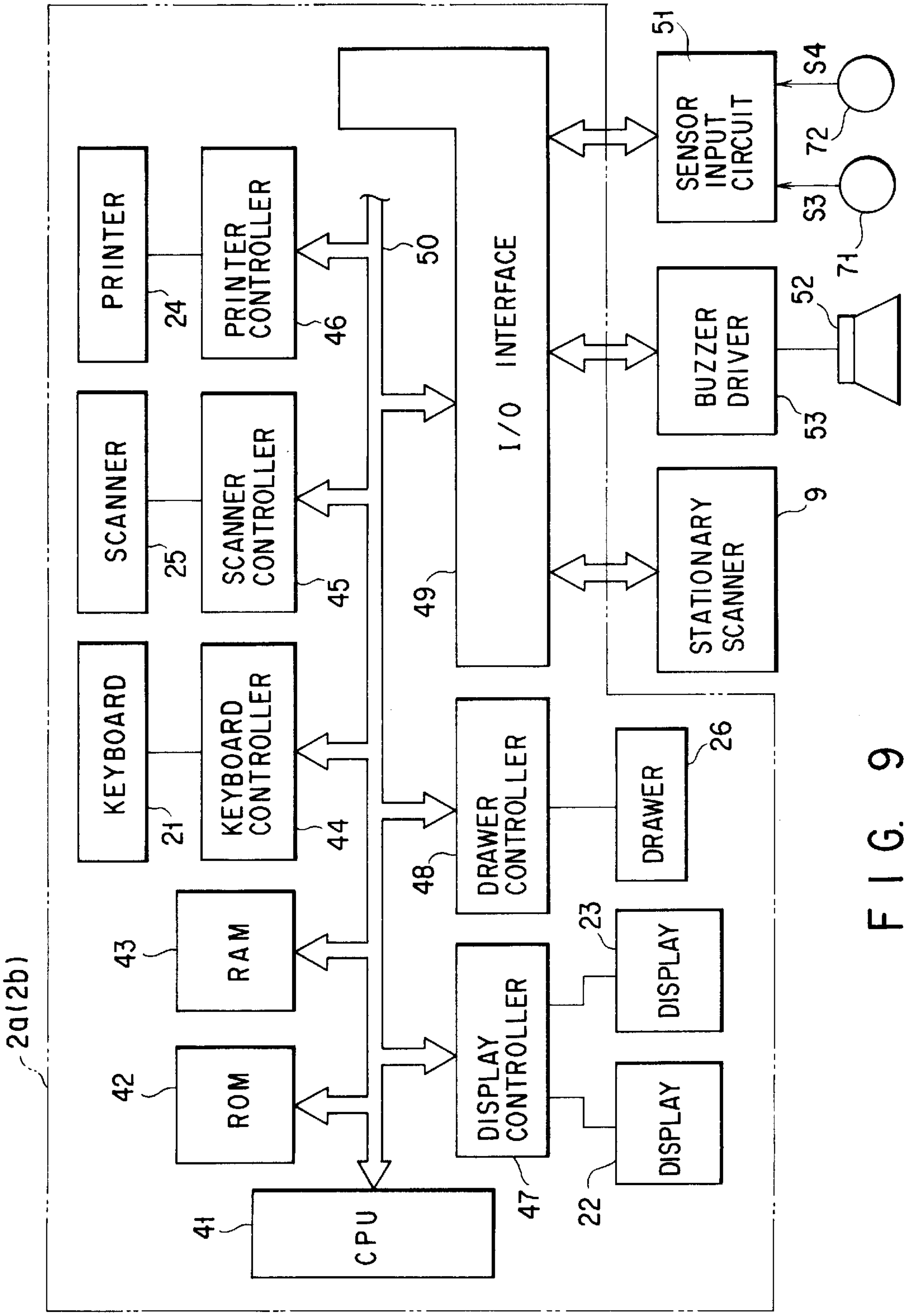
FIG. 9 is a block diagram showing the construction of a control circuit for the checkout device shown in FIG. 8.

As shown in FIG. 9, signals S3 and S4 respectively supplied from the third and fourth article sensors 71 and 72 are input to the input circuit 51. Further, an enable signal en is supplied from the CPU 41 to the stationary scanner 9 and the stationary scanner 9 effects the bar code reading operation only when the enable signal en is set in the ON state As is specifically shown in FIG. 10, in the RAM 43, a flag area 65 for the article extraction flag F3 is formed. The article extraction flag F3 is a flag which is set when an article is extracted from the first counter 4 and is reset when the bar code reading is effected by the scanner 9 and the flag memory 65 constructs storing means for the article extraction flag.

Figure 11:
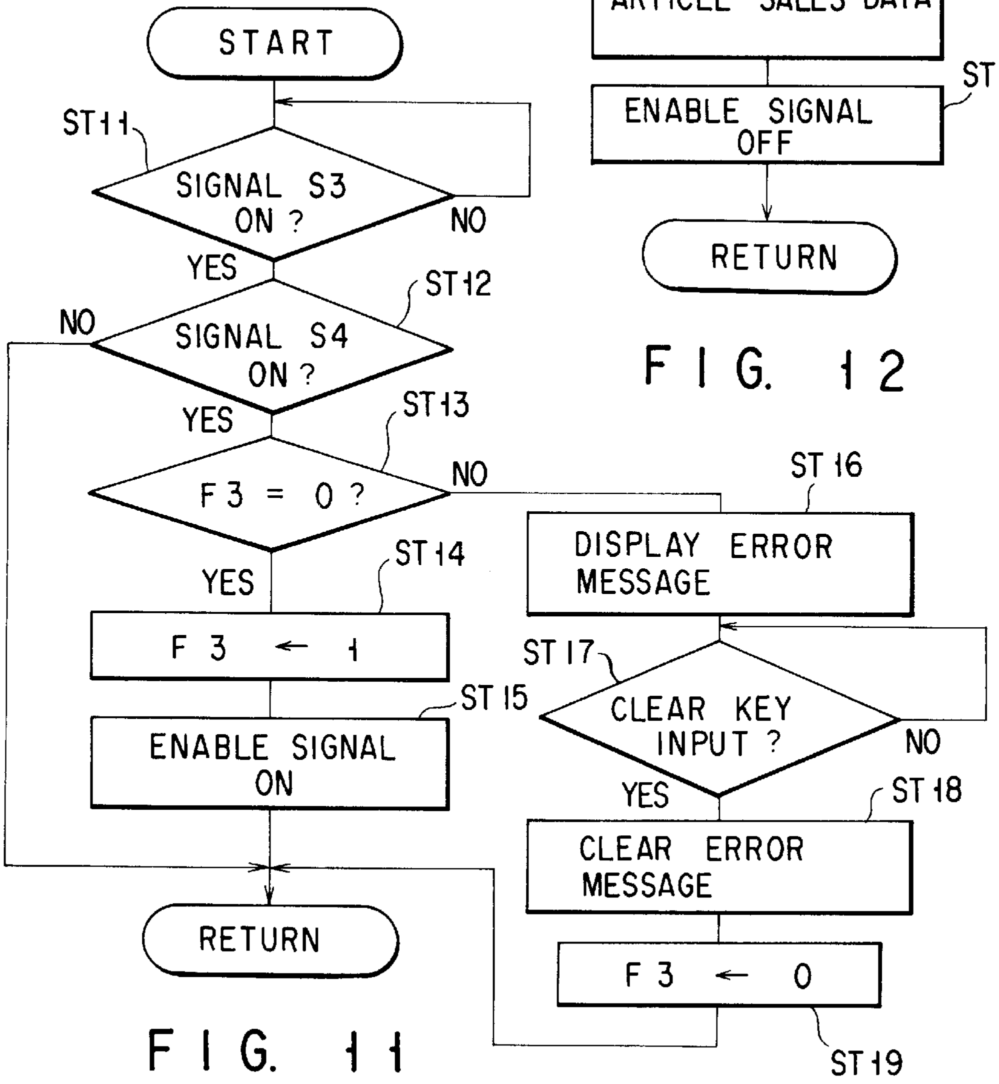
FIGS. 11 and 12 are flowcharts showing the main processes performed by a CPU shown in FIG. 9.
Figure 12:
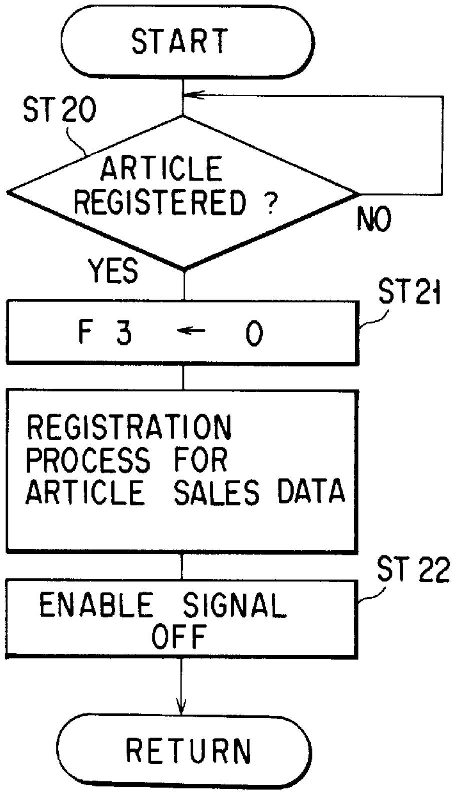

Thus, the CPU 41 is controlled by the program so as to perform both of the processes shown in FIGS. 11 and 12.

That is, as shown in FIG. 11, the CPU 41 waits until an article passing directly above the third article sensor 71 is detected as the step ST11. Then, if a sensor-ON signal S3 is input from the third article sensor 71 and the passage of an article is detected, an CPU 41 waits until the article passing directly above the fourth article sensor 72 is detected as the step ST12. Then, when the sensor-ON signal S4 is input from the fourth article sensor 72 within a period corresponding to the time which is necessary and sufficiently long for the customer to move the hand holding the article from the position of the third article sensor 71 to the position of the fourth article sensor 72 and the passage of the article is detected, the CPU 41 checks the article extraction flag F3 as the step ST13 (article extraction flag checking means)

In this case, if the flag F3 is reset at "0", it is determined that the bar code of the article scanned in the preceding cycle is correctly read by the stationary scanner 9, and therefore, the CPU 41 sets the article extraction flag F3 to "1" as the step ST14 (article extraction flag setting means)

Next, the CPU 41 sets the enable signal en for the stationary scanner 9 into the ON state as the step ST15 to permit the bar code reading operation of the stationary scanner 9 and then the operation is returned to the start of the process.

On the other hand, if it is determined in the step ST13 that the article extraction flag F3 is set at "1", the CPU 41 supplies a buzzer-ON signal to the buzzer driving circuit 53 via the input/output interface 49 for a preset period of time as the step ST16 and causes the name display sections 31, 35, for example, of the cashier display unit 22 and customer display unit 23 to display messages indicating that the previous article is not registered and the registration for the article should be effected again since the scanning operation for a next article is started even though the bar code of an article which is previously scanned is not correctly read by the stationary scanner 9 (unregistered article alarming means).

After this, if the clear key of the keyboard 21 is operated and input as the step ST17, supply of the buzzer-ON signal is interrupted and output of the message is interrupted as the step ST18. Then, the article extraction flag F3 is reset to "0" as the step S19 and the operation is returned to the start of the process.

When the passage of an article is not detected by the fourth article sensor 72 in the preset period of time in the step ST12, the operation is returned to the start of the process since it can be determined that the article passing above the third article sensor 71 is not an article whose bar code should be read nor a hand holding the article.

Further, as shown in FIG. 12, the CPU 41 waits for the article registration as the step ST20. Then, when the bar code affixed to the article is read by the stationary scanner 9 and bar code data is input via the input/output interface 49, the CPU 41 determines that the article registration is effected and resets the article extraction flag F3 to "0" as the step ST21 (article extraction flag resetting means).

Next, like the first embodiment, the normal article sales data registration process is effected. Then, the enable signal en for the stationary scanner 9 is set into the OFF state as the step ST22, and after the bar code reading operation of the stationary scanner 9 is inhibited, the operation is returned to the start of the process.

In the self-scanning checkout device of the second embodiment with the above construction, after the customer puts articles to be purchased or the shopping basket 8 containing the articles on the first counter 4, the customer holds the articles one at a time by hand and moves the article from the first counter 4 to the second counter 5 with the bar code portion thereof set to face the reading surface of the stationary scanner 9 so as to scan the article. It is supposed that the article extraction flag F3 is reset at the time of first article scanning operation.

Then, since a first article extracted from the first counter 4 or the hand of the customer holding the article is detected by the third article sensor 71 and the fourth article sensor 72 in this order, the article extraction flag F3 is set and the enable signal en is set in the ON state by the programmed process (ST11, ST12, ST13, ST14, ST15) shown in FIG. 11, thereby making ready for the bar code reading operation by the stationary scanner 9.

As a result, the bar code of the article is read by the stationary scanner 9 and sales data of the article is registered based on the bar code by the programmed process shown in FIG. 12. Further, the article extraction flag F3 is reset and the enable signal en is set in the OFF state so as to inhibit the bar code reading operation by the stationary scanner 9.

Next, if the customer starts the scanning operation for a second article, the process of registering the article sale data is effected in the same manner as in the case of the first article.

In a case where the bar code portion of the article is not set to face the reading surface of the stationary scanner 9 at the time of scanning operation for the first article, for example, and the article is moved to the second counter 5 without reading the bar code, the article extraction flag F3 is kept set.

If, in this state, the customer starts the scanning operation for the second article, the buzzer 52 is activated by the programmed process (ST11, ST12, ST13, ST16, ST17, ST18, ST19) shown in FIG. 11 and a message indicating that the previous article is not registered and the article should be registered again is displayed, for example, on the name display sections 31, 35 of the cashier display unit 22 and customer display unit 23 so as to inhibit the operation of registering the second and succeeding articles.

In the above case, after both of the customer and the cashier confirm the registration error for the first article, the cashier operates and inputs the clear key of the keyboard 21. Then, since the article extraction flag F3 is reset to make ready for the scanning operation, the customer may effect the registration starting from the first article.

Thus, according to the second embodiment, a highly reliable self-scanning checkout device can be realized which can prevent a dishonest act of the customer for intentionally effecting incorrect registration and an operation mistake by the customer who misunderstands that the article is correctly scanned and registered even though the bar code thereof is not read by the scanner 9 and tries to effect the registration for a next article with a simple construction obtained by arranging the two article sensors 71, 72 on the upstream side from the stationary scanner 9 along the article moving direction. Therefore, the same effect as that of the first embodiment can be attained.

Further, in the second embodiment, when article sales data of an article whose bar code is read by the stationary scanner 9 is registered, the enable signal en is first set into the OFF state to inhibit the bar code reading operation by the stationary scanner 9, and then, when a next article or a hand holding the article is detected by the third article sensor 71 and fourth article sensor 72 in this order, the enable signal en is set into the ON state to make ready for the bar code reading operation. Therefore, even if an article extracted from the first counter 4 is moved above the reading surface of the stationary scanner 9 without passing the article above the third article sensor 71 and fourth article sensor 72, the bar code thereof is not read.

Therefore, since the customer must put his hand holding the article on the counter which the cashier can always watch when he moves the article to be purchased from the first counter 4 to the second counter 5 for scanning registration, it becomes difficult for the customer to do a dishonest act.

In the second embodiment, the two article sensors 71, 72 are arranged on the upstream side from the stationary scanner 9 along the article moving direction, but it is possible to arrange only one article sensor on the upstream side from the stationary scanner 9.

Further, the same effect as that of the above embodiment can be attained by sequentially arranging three or more article sensors along the article moving direction, determining whether or not the article extraction flag F3 is reset only when the movement of an article is detected by the sensors in an order from the uppermost stream side sensor with respect to the article moving direction, and issuing an alarm when the flag is set. In a case where three or more article sensors are arranged, the movement of an article (or a hand holding the article) can be more precisely detected so that the reliability can be further enhanced.

The alarming means for indicating the presence of an unregistered article is not limited to use of both of the buzzer and the message display, but may be attained by use of only a buzzer sound or message display. Further, it is also possible to output a message sound by incorporating a speech synthesizer. This is also applied to the unregistered article passage alarming means in the first embodiment.

Next, a self-scanning checkout device according to a third embodiment of this invention is explained with reference to FIGS. 13 to 16. Portions which are substantially the same as those of the first and second embodiments are denoted by the same reference numerals and the detail explanation therefor is omitted.

Figure 13:
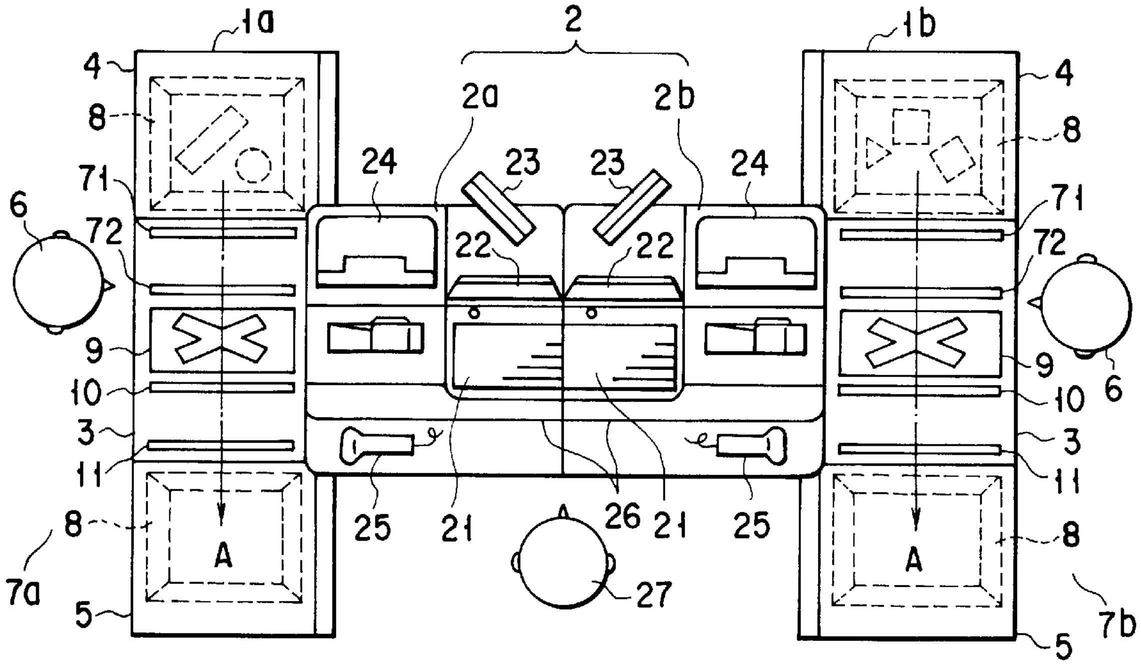
FIG. 13 is a plan view showing the whole construction of a self-scanning checkout device according to a third embodiment of this invention.

FIG. 13 shows the whole construction of the the self-scanning checkout device. The third embodiment is similar to the first and second embodiments except that two downstream side article sensors 10, 11 (corresponding to the first article sensor 10 and second article sensor 11 in the first embodiment) are fixed on the downstream side from the stationary scanner 9 used as the article information reading means in the registering section (input section) 3 along the article moving direction A and two upstream side article sensors 71, 72 (corresponding to the third article sensor 71 and fourth article sensor 72 in the second embodiment) are fixed on the upstream side from the stationary scanner 9 along the article moving direction A.

Signals S1, S2, S3, S4 from the sensors 10, 11, 71, 72 are input to the sensor input circuit 51.

Figure 10:
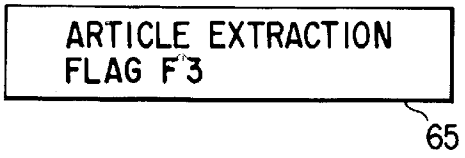
FIG. 10 is a flowchart showing main memory areas provided in a RAM shown in FIG. 9.

In the RAM 43, flag memories 61, 62 for the in-registration flag F1 and article registration flag F2 shown in FIG. 4 and counter memories 63, 64 for the registered article number counter M and passing article number counter N are formed, and a flag memory 65 for the article extraction flag F3 shown in FIG. 10 is not formed.

Figure 14:
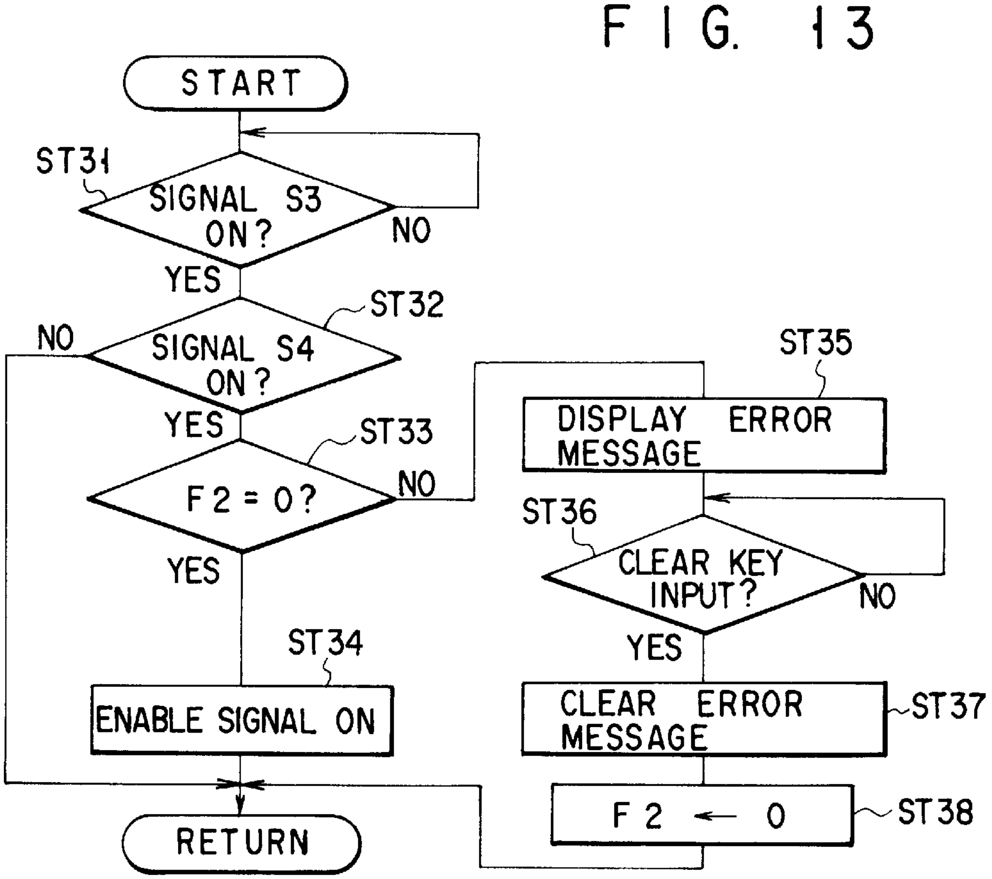
FIGS. 14, 15, and 16 are flowcharts showing the main processes performed by a CPU used in the checkout device shown in FIG. 13.
Figure 15:
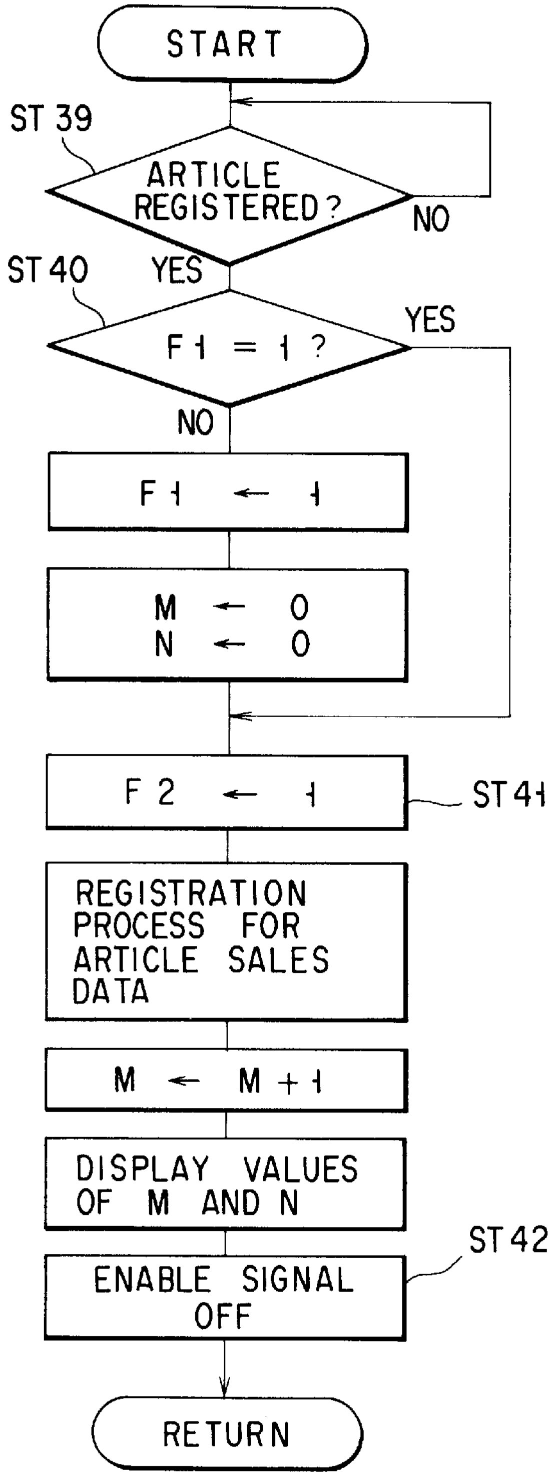
Figure 16:
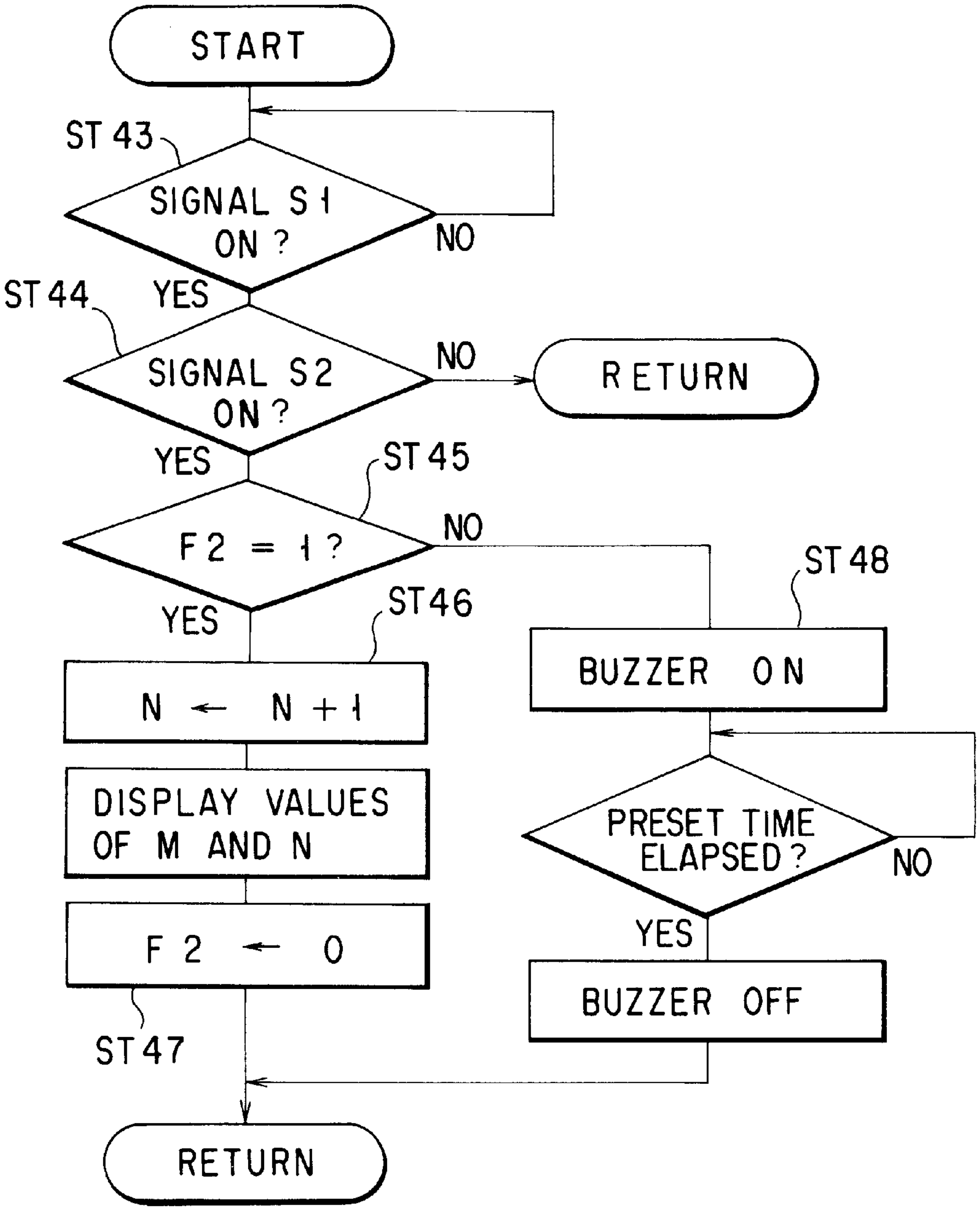

The CPU 41 is controlled by the program to perform each of the processes shown in FIGS. 14, 15 and 16.

That is, the CPU 41 waits until an article passing directly above the third article sensor 71 is detected by the sensor 71 as the step ST31 as shown in FIG. 14. When a sensor-ON signal is input from the third article sensor 71 and the passage of an article is detected, the CPU 41 waits until an article passing directly above the fourth article sensor 72 is detected by the sensor 72 as the step ST32. When a sensor-ON signal S4 is input from the fourth article sensor 72 in a period corresponding to the time which is necessary and sufficiently long for the customer to move his hand holding the article from the position of the third article sensor 71 to the position of the fourth article sensor 72 and the passage of an article is detected, the CPU 41 checks the article registration flag F2 as the step ST33 (article registration flag checking means).

In this case, if the flag F2 is reset to "0", it is determined that the article is moved to the second counter 5 after the bar code of the article which is scanned in the preceding cycle is correctly read by the stationary scanner 9, the CPU 41 sets the enable signal en for the stationary scanner 9 to make ready for the bar code reading operation by the stationary scanner 9 as the step ST34, and then the operation is returned to the start of the process.

When it is determined in the step ST33 that the article registration flag F2 is set at "1", the CPU supplies a buzzer-ON signal to the buzzer driving circuit 53 via the input/output interface 49 for a preset period of time as the step ST35 and causes the name display sections 31, 35, for example, of the cashier display unit 22 and customer display unit 23 to display a message indicating that the previous article is not registered and the registration for the article should be effected again since the scanning operation for a next article is started even though the bar code of an article which is previously scanned is not correctly read by the stationary scanner 9 or the bar code thereof is correctly read but the article is not fed to the second counter 5 (unregistered article alarming means).

After this, if the clear key of the keyboard 21 is operated and input as the step ST36, supply of the buzzer-ON signal is interrupted and output of the message is interrupted as the step ST37. Then, the article registration flag F2 is reset to "0" as the step ST38 and the operation is returned to the start of the process.

When the passage of an article is not detected by the fourth article sensor 72 in the preset period of time in the step ST32, the operation is returned to the start of the process since it can be determined that the article passing above the third article sensor 71 is not an article whose bar code should be read nor a hand holding the article.

Further, as shown in FIG. 15, the CPU 41 waits for the article registration as the step ST39. Then, when the bar code affixed to the article is read by the stationary scanner 9 and bar code data is input via the input/output interface 49, the CPU 41 determines that the article registration is effected and checks the in-registration flag F1 as the step ST40. If the in-registration flag F1 is reset at "0", it is determined that the registration is the first registration for an article to be purchased by one customer, and therefore, the CPU 41 sets the article registration flag F1 to "1" and clears the registered article number counter M and passing article number counter N to "0". When the in-registration flag F1 is already set, it is determined that the registration is the registration for a second or succeeding article, and therefore, the above process is not effected.

Then, the CPU 41 sets the article registration flag F2 to "1" (article registration flag setting means) Next, like the first and second embodiments, the normal article sales data registration process is effected. At this time, the count of the registered article number counter M is counted up by +1. Then, the count of the registered article number counter M is displayed on the display section 33 of the cashier display unit 22 and the display section 37 of the customer display unit 23 and the count of the passing article number counter N is kept displayed on the display section 34 of the cashier display unit 22.

After this, the enable signal en for the stationary scanner 9 is set to the OFF state to inhibit the bar code reading operation of the stationary scanner 9 as the step ST42, and then, the operation is returned to the start of the process.

Further, as shown in FIG. 16, the CPU 41 waits until an article passing above the first article sensor 10 is detected by the article sensor 10 as the step ST43. When a sensor-ON signal is input from the first article sensor 10 and the passage of an article is detected, it waits for the second sensor 11 to detect the passage of the article directly above the sensor as the step ST44. When a sensor-ON signal S2 is input from the second sensor 11 in a period corresponding to the time necessary and sufficiently long for the customer to move the hand holding the article from the position of the first sensor 10 to the position of the second sensor 11 and the passage of the article is detected, it checks the article registration flag F2 as the step ST45.

At this time, if the flag F2 is set, it can be determined that an article whose bar code is read by the stationary scanner 9 has passed above the first article sensor 10 and has passed above the second article sensor 11, that is, the article has moved towards the downstream side, and therefore, the count of the passing article number counter N is counted up by +1 as the step ST46. Then, the count of the passing article number counter N is displayed on the display section 34 of the cashier display unit 22, and at the same time, the count of the registered article number counter M is kept displayed on the display section 33 of the cashier display unit 22 and the display section 37 of the customer display unit 23. After this, the article registration flag F2 is reset to "0" as the step ST47. Then, the operation is returned to the start of the process.

If it is determined in the step ST45 that the article registration flag F2 is reset, it can be determined that an article whose bar code is not read by the stationary scanner 9 has passed above the first article sensor 10 and has passed above the second article sensor 11, and therefore, a buzzer-ON signal is supplied to the buzzer driving circuit 53 via the input/output interface 49 for a preset period of time as the step ST48.

Then, after the signal is supplied for the preset period of time, supply of the buzzer-ON signal is interrupted and the operation is returned to the start of the process.

If the passage of an article is not detected by the second article sensor 11 in the preset period of time in the step ST44, it can be determined that an article which has passed above the first article sensor 10 is not an article which has been subjected to the bar code reading operation nor a hand holding the article, and therefore, the operation is returned to the start of the process.

In the self-scanning checkout device according to the third embodiment thus constructed, the customer puts articles to be purchased or the shopping basket 8 having articles contained therein on the first counter 4, holds the articles by hand one at a time and then moves the articles one by one from the first counter 4 to the second counter 5 with the bar code portion thereof set to face the reading surface of the stationary scanner 9. In this case, it is supposed that the in-registration flag F1 and the article registration flag F2 are reset at the time of scanning operation for the first article.

Then, since the first article extracted from the first counter 4 or a customer's hand holding the article is detected by the third article sensor 71 and second article sensor 72 in this order, the enable signal en is set to the ON state by the programmed process (ST31, ST32, ST33, ST34) shown in FIG. 14 to make ready for the bar code reading operation by the stationary scanner 9.

As a result, the bar code of the article is read by the stationary scanner 9, sales data of the article is registered by the programmed process shown in FIG. 15 based on the bar code read by the stationary scanner 9 and the article registration flag F2 is set, Further, the enable signal en is set to the OFF state to inhibit the bar code operation by the stationary scanner 9.

Then, since the movement of an article (or a hand holding the article) is detected by the first article sensor 10 and second article sensor 11 in this order, the article registration flag F2 is reset.

After this, if the customer starts the scanning operation for a second article, article sales data is registered in the same manner as in the case for the first article.

In a case where the bar code portion of the article is not set to face the reading surface of the stationary scanner 9 at the time of scanning operation for the first article, for example, and the article is moved to the second counter 5 without reading the bar code, the article extraction flag F3 is kept set.

At this time, a buzzer sound alarming that an unregistered article is passed is generated, but if the customer neglects the alarm and starts the scanning operation for the second article, the buzzer 52 is activated by the programmed process (ST31, ST32, ST33, ST35, ST36, ST37, ST38) shown in FIG. 14 and a message indicating that the previous article is not registered and the article should be registered again is displayed, for example, on the name display sections 31, 35 of the cashier display unit 22 and customer display unit 23 so as to inhibit the operation of registering the second and succeeding articles.

Like the second embodiment, in the above case, after both of the customer and the cashier confirm the registration error for the first article, the cashier operates and inputs the clear key of the keyboard 210 Then, since the article extraction flag F3 is reset to make ready for the scanning operation, the customer may effect the registration starting from the first article.

Thus, like the first and second embodiments, according to the third embodiment, a highly reliable self-scanning checkout device can be realized which can prevent a dishonest act of the customer for intentionally effecting incorrect registration and an operation mistake by the customer who misunderstands that the article is correctly scanned and registered even though the bar code thereof is not read by the scanner 9 and tries to effect the registration for a next article.

In the first to third embodiments, the first counter 4 is arranged as the unregistered article placing section on the upstream side from the registering section and the second counter 5 is arranged as the registered article placing section on the downstream side from the registering section, but a system in which the registering section is formed of vertical type and the first counter 4 is made in communication with the second counter 5 may be used. Further, a shopping cart may be used as the unregistered article placing section instead of the first counter 4. Likewise, the shopping cart or automatic bagging machine may be used as the registered article placing section instead of the second counter 5, and in this case, the same effect as described before can be attained.

As described above, according to this invention, a highly practicable self-scanning checkout device can be realized which is simple in construction and which can lower the installation cost, reduce the size, and make complicated information management unnecessary.

Further, it is possible to easily detect the erroneous operation or correct operation for self-scanning by displaying the total numbers of the registered articles and passing articles on the real time base.

In addition, it is possible to immediately detect the movement of an article whose bar code is not read by the article information reading means to the registered article placing section and inform the result by disposing the article sensor on the downstream side from the article information reading means in the registering section.

Further, it is possible to detect the movement of an article whose bar code is not read by the article information reading means to the registered article placing section and inform the result before the information reading for a next article is started, and therefore, the information reading for the next article can be inhibited by disposing the article sensor on the upstream side from the article information reading means in the registering section.

There will now be described a self-scanning checkout device according to a fourth embodiment of this invention with reference to the accompanying drawings.

Figure 17:
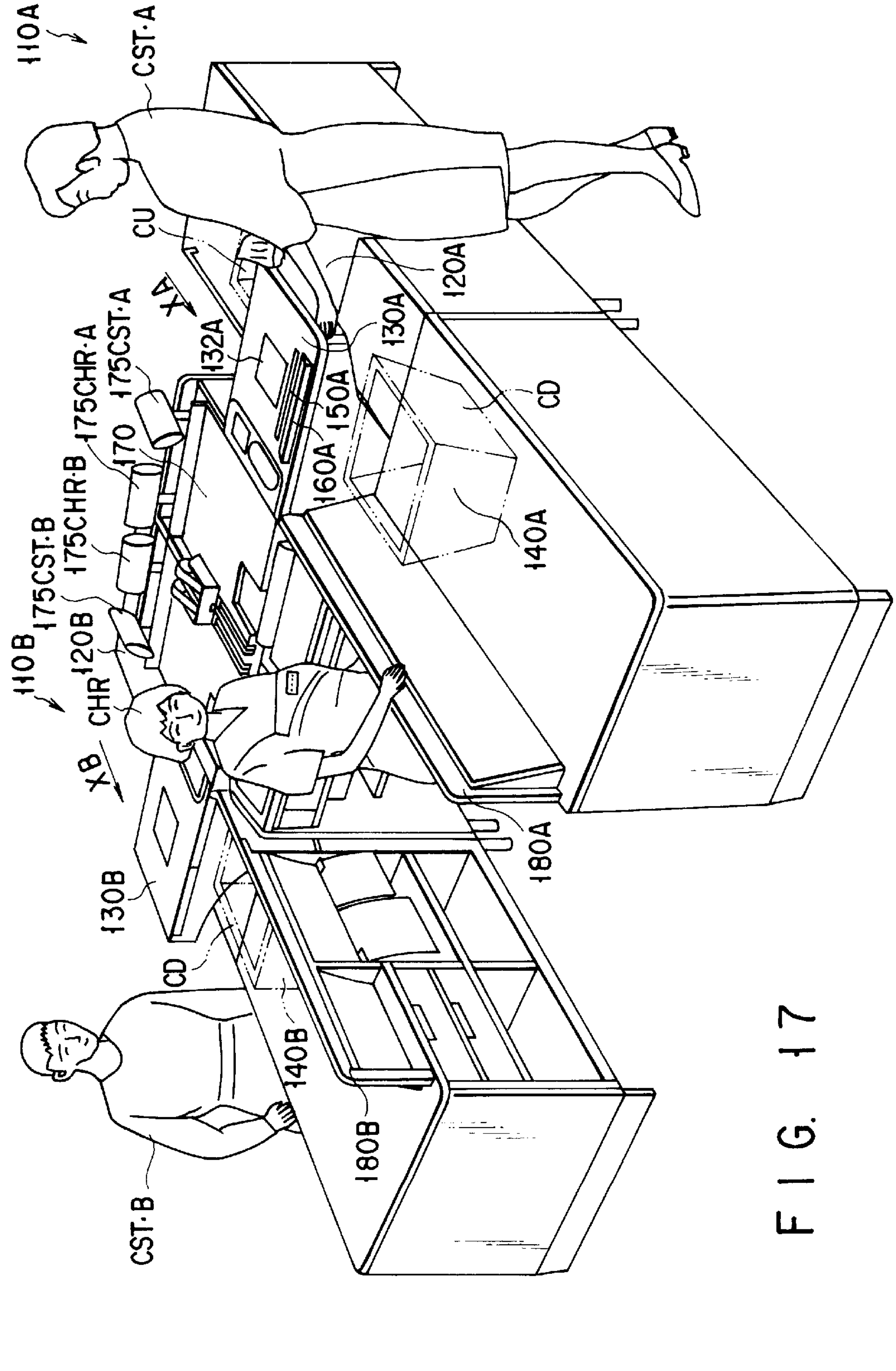
FIG. 17 is a view showing the whole construction of a self-scanning checkout device according to a fourth embodiment of this invention.

FIG. 17 shows the whole construction of the self-scanning checkout device. This checkout device is of a two-lane type in which two checkout counters 100A, 110B are arranged in parallel and a settlement section having an electronic cash register 170 (which is hereinafter referred to as an ECR) is disposed between the checkout counters. Customers CST-A, CST-B walk along customer's paths (checkout lanes) created outside the checkout counters 110A, 110B, respectively.

The checkout counter 110A has a first counter 120A used as an unregistered article placing section on which unregistered purchased articles are placed and disposed on the upstream side of the article moving direction (direction indicated by an arrow XA in FIG. 17) and a second counter 140A used as a registered article placing section on which registered purchased articles are placed and disposed on the downstream side with a registering section (input section) 130A disposed between the first and second counters. The first and second counters 120A and 140A are formed lower than the registering section 130A to receive shopping baskets CU, CD which are provided in the store and placed thereon. In the registering section 130A, a stationary scanner 132A is buried at a central portion as an article information reading unit for optically reading a bar code affixed to an article. Further, first and second article sensors 150A, 160A are set close to each other and fixed in substantially the same plane as the reading surface of the stationary scanner 132A and on the downstream side from the reading surface along the article moving direction XA. The sensors 150A, 160A are of a light reflection type and generate sensor-ON signals when an article passes a position above the sensors. For example, the first article sensor 150A is fixed on the upstream side between the stationary scanner 132A and the second counter 140A, and the second article sensor 169A is fixed on the downstream side between the stationary scanner 132A and the second counter 140A.

The checkout counter 110B has a first counter 120B used as an unregistered article placing section on which unregistered purchased articles are placed and disposed on the upstream side of the article moving direction (direction indicated by an arrow XB in FIG. 17) and a second counter 140B used as a registered article placing section on which registered purchased articles are placed and disposed on the downstream side with a registering section (input section) 130B disposed between the first and second counters. The first and second counters 120B and 140B are formed lower than the registering section 130A to receive shopping baskets CU, CD which are provided in the store and placed thereon In the registering section 130B, a stationary scanner 132B is buried at a central portion as an article information reading unit for optically reading a bar code affixed to an article. Further, first and second article sensors 150B, 160B are set close to each other and fixed in substantially the same plane as the reading surface of the stationary scanner 132B and on the downstream side from the reading surface along the article moving direction XB. The sensors 150B, 160B are of a light reflection type and generate sensor-ON signals when an article passes a position above the sensors For example, the first article sensor 150B is fixed on the upstream side between the stationary scanner 132B and the second counter 140B, and the second article sensor 160B is fixed on the downstream side between the stationary scanner 132B and the second counter 140B.

The ECR 170 includes a set of a keyboard, a printer, a cashier display unit 175CHR-A, and a customer display units 175CST-A which are provided for the checkout counter 110A, a set of a keyboard, a printer, a cashier display unit 175CHR-B, and a customer display units 175CST-B which are provided for the checkout counter 110B, and a set of a control circuit, a drawer, and other components which are provided commonly for the checkout counters 110A and 110B, and is constructed such that article registration can be separately effected based on article information (article code) self-scanned at the registering sections 130A, 130B.

The checkout counter 110B is different in the installation position but is substantially the same in the construction as the checkout counter 110A. Therefore, the following description is made only for the checkout counter 110A so as to omit the repetitive explanation.

A basket CU containing articles purchased by the customer CST-A is placed on the first counter 120A and an empty basket CD is placed on the second counter 140A. A partition wall 180A is provided at an end of the second counter 140A on the settlement section side. The first and second counter 120A and 140A are used for receiving the article G temporarily placed thereon, at least one of them is not necessarily a sucker table form shown in FIG. 17 and can be a self-running cart or conveyer.

The customer extracts an article from the basket CU and self-scans the article by use of the stationary scanner 132A at the registering section 130A. Then, the article is registered in the ECR 170. Article registration data can be determined by means of the customer display unit 175CST-A. Thus, the article correctly self-scanned is further fed in the article moving direction XA and received into the basket CD. When the article registration for all of the articles to be purchased is completed, the cashier CHR effects the accounting process by use of the ECR 170. Then, the accounting operation including the payment and reception of cash is effected.

Figure 18:
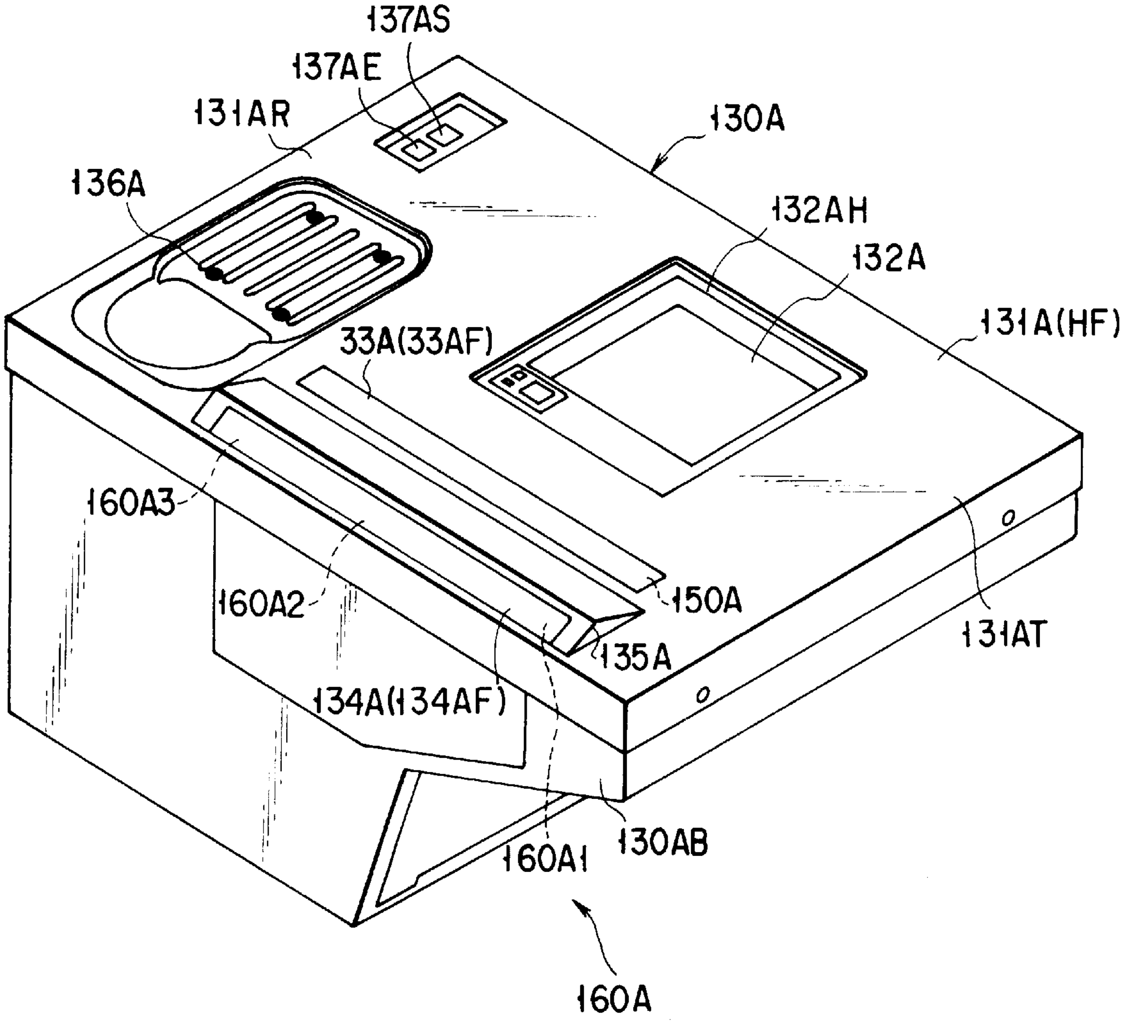
FIG. 18 is an external perspective view for illustrating a registering section shown in FIG. 17.
Figure 21:
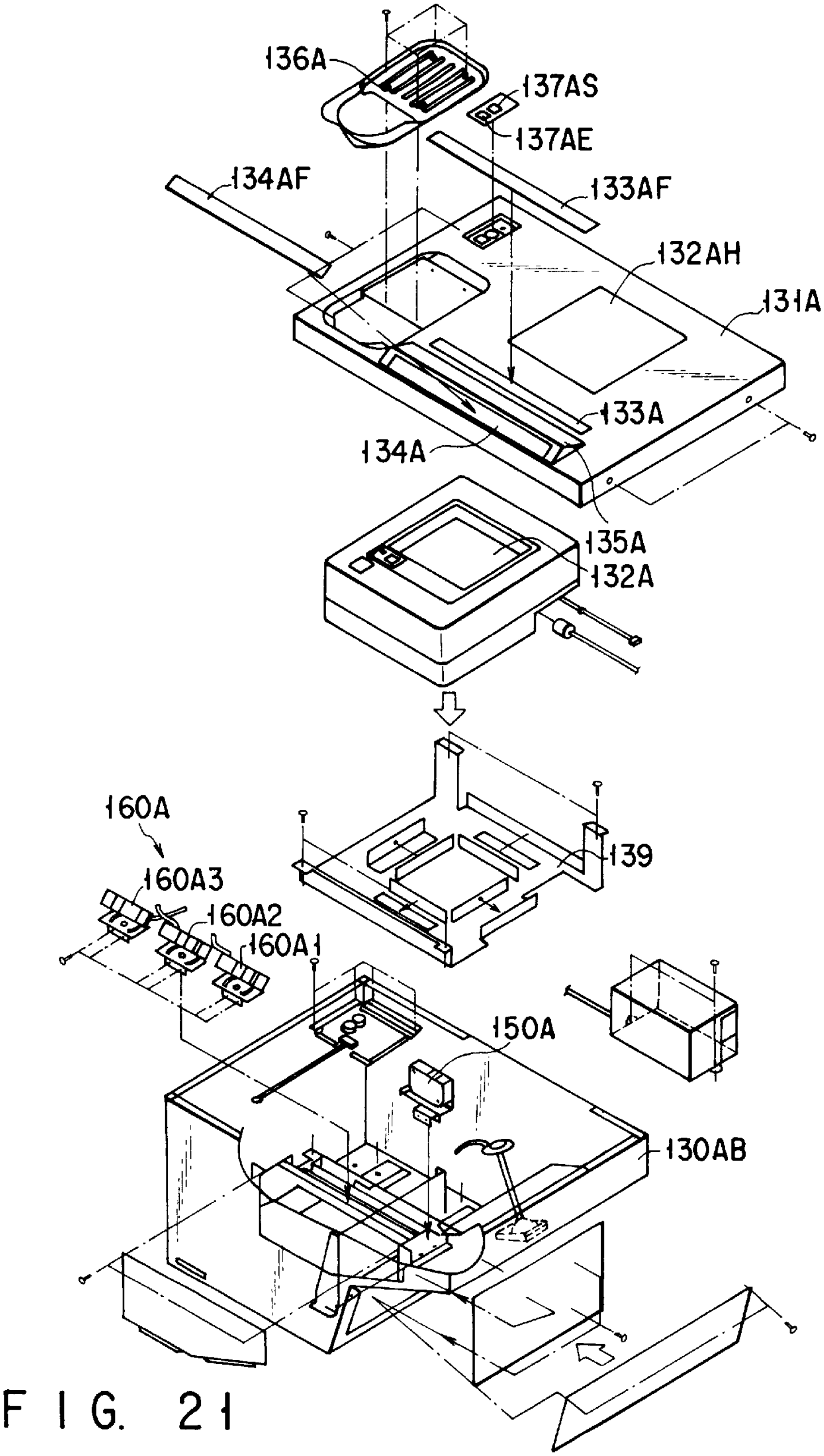
FIG. 21 is an exploded perspective view of the registering section shown in FIG. 18.

As shown in FIG. 18, the registering section 130A is constructed by the stationary scanner 132A set in a unit body formed of a main body case 130AB and upper lid 131A. As shown in FIG. 21, the stationary scanner 132A is fixed in the main body case 130AB via a mounting member 139 and emits a scanning beam upwardly via a scanning window 132AH of the upper lid 131A to read article information based on reflected light from the article.

The upper lid 131A forms a horizontal surface HF, and a self-scanning start key 137AS, self-scanning end key 137AE, and cash receiving tray 136A are provided on the opposite side 131AR of the customer side 131AT. A first detection window 133A in which an optical filter 133AF is formed and a second detection window 134A in which an optical filter 134AF is formed are disposed on the downstream side from the scanning window 132AH.

The second detection window 134A is formed on the downstream side surface of a triangular frame 135A which projects upwardly from the horizontal surface HF. The frame 135A is used to define an inclination angle θ2 of the second detection light beam B2 shown in FIG. 19 and prevent the first detection light beam B1 from being interrupted when the article or the like is placed on the first detection window 133A.

Figure 19:
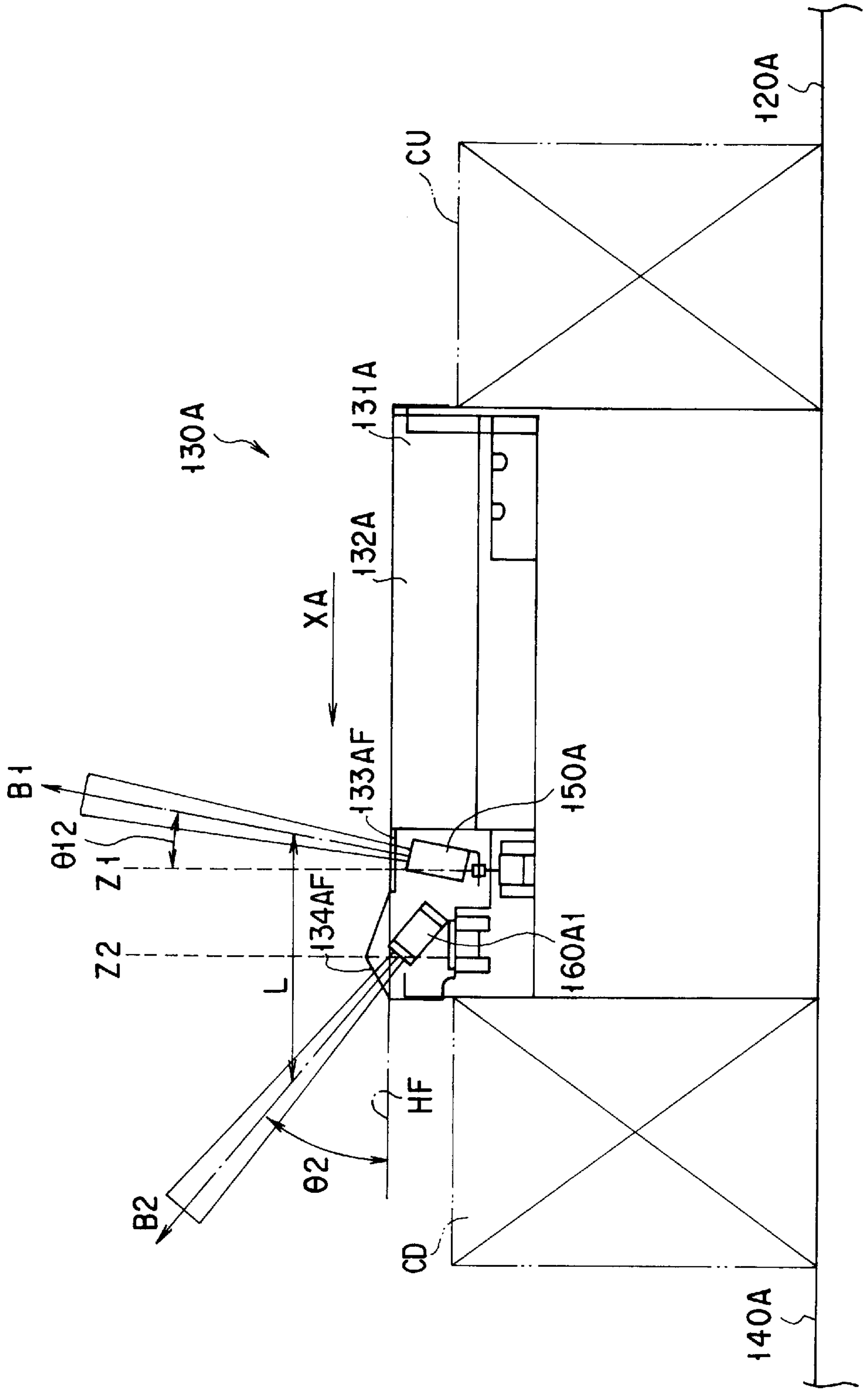
FIG. 19 is a front view of a first checkout counter from a checkout lane, for illustrating the orientations of first and second article sensors shown in FIG. 18.
Figure 22:
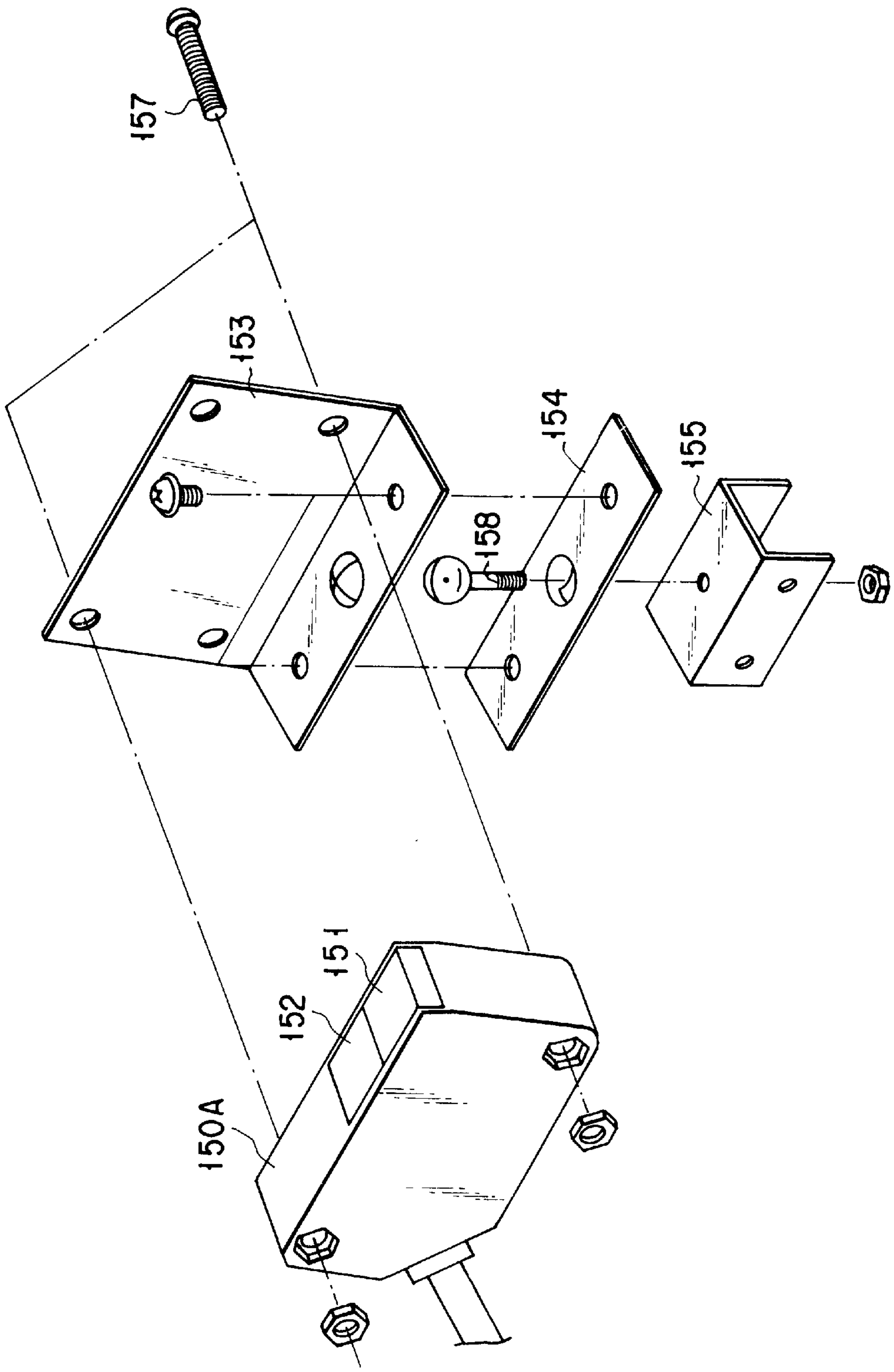
FIG. 22 is an exploded perspective view of a portion including a reflection type optical detection unit for the first article sensor shown in FIG. 18.

The first article sensor 150A is disposed on the stationary scanner 132A side in the registering section 130A as shown in FIG. 19 and is constructed by a reflection type optical detection unit formed of a combination of a light emitting element 151 and a light receiving element 152 as shown in FIG. 22. That is, the first detection light B1 output from the light emitting element 151 is emitted upwardly through the first detection window 133A shown in FIG. 19, and light reflected from the article or the hand of the customer CST-A holding the article is received by the light receiving element 152 so as to directly or indirectly detect the passage of the article fed in the article moving direction XA.

From the view point of the article passage detection, it is preferable to use a large number of first detection light beams B1. However, if a large number of reflection type optical detection units are disposed to increase the number of first detection light beams B1, the cost becomes high.

Therefore, the first article sensor 150A is constructed by a single reflection type optical detection unit, thereby significantly lowering the cost. However, if the first detection light beam B1 is emitted along the vertical axis Z1 shown in FIGS. 19 and 20 by use of the single reflection type optical detection unit, there occurs a possibility that some problem occurs depending on the feeding position of the article G of the customer CST-A.

Figure 24:
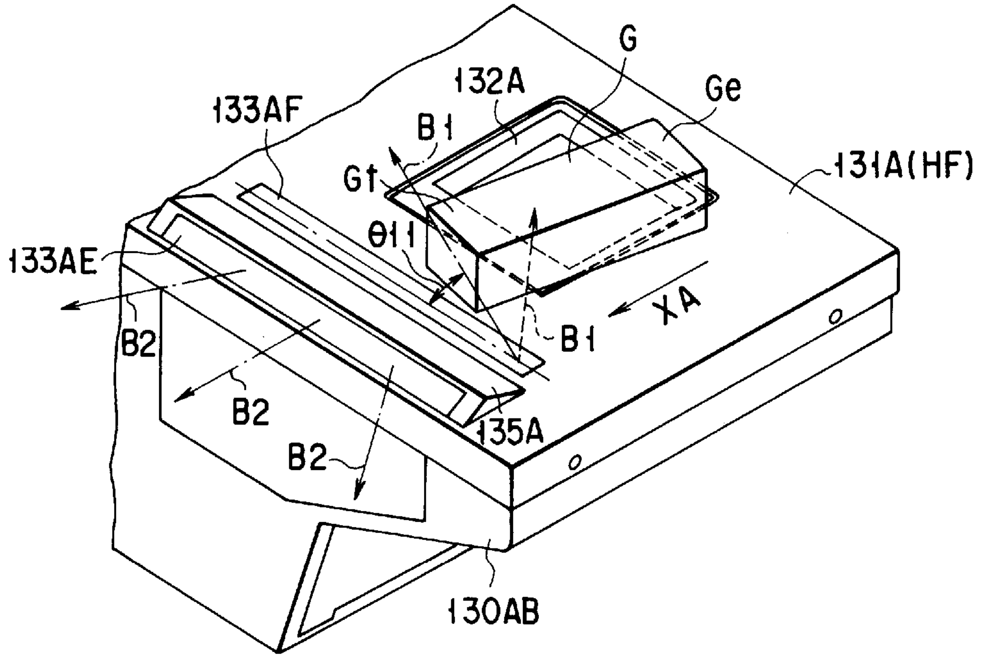
FIG. 24 is a view for illustrating the emitting directions of first and second detection light beams from the first and second article sensors shown in FIG. 18.

That is, in a case where the self-scanning operation is effected by setting the bar code affixed to the underside of the rear end portion Ge of of the article G shown in FIG. 24 to face the stationary scanner 132A, there is a possibility that the second detection light beam B2 is applied to the front end portion Gt before the first detection light beam B1 is applied thereto, particularly when the article G is long and large. In this case, it is considered that the effect of the excellent detection function obtained by emitting the first detection light beam B1 and second detection light beam B2 in parallel in the article moving direction XA may be degraded.

Figure 20:
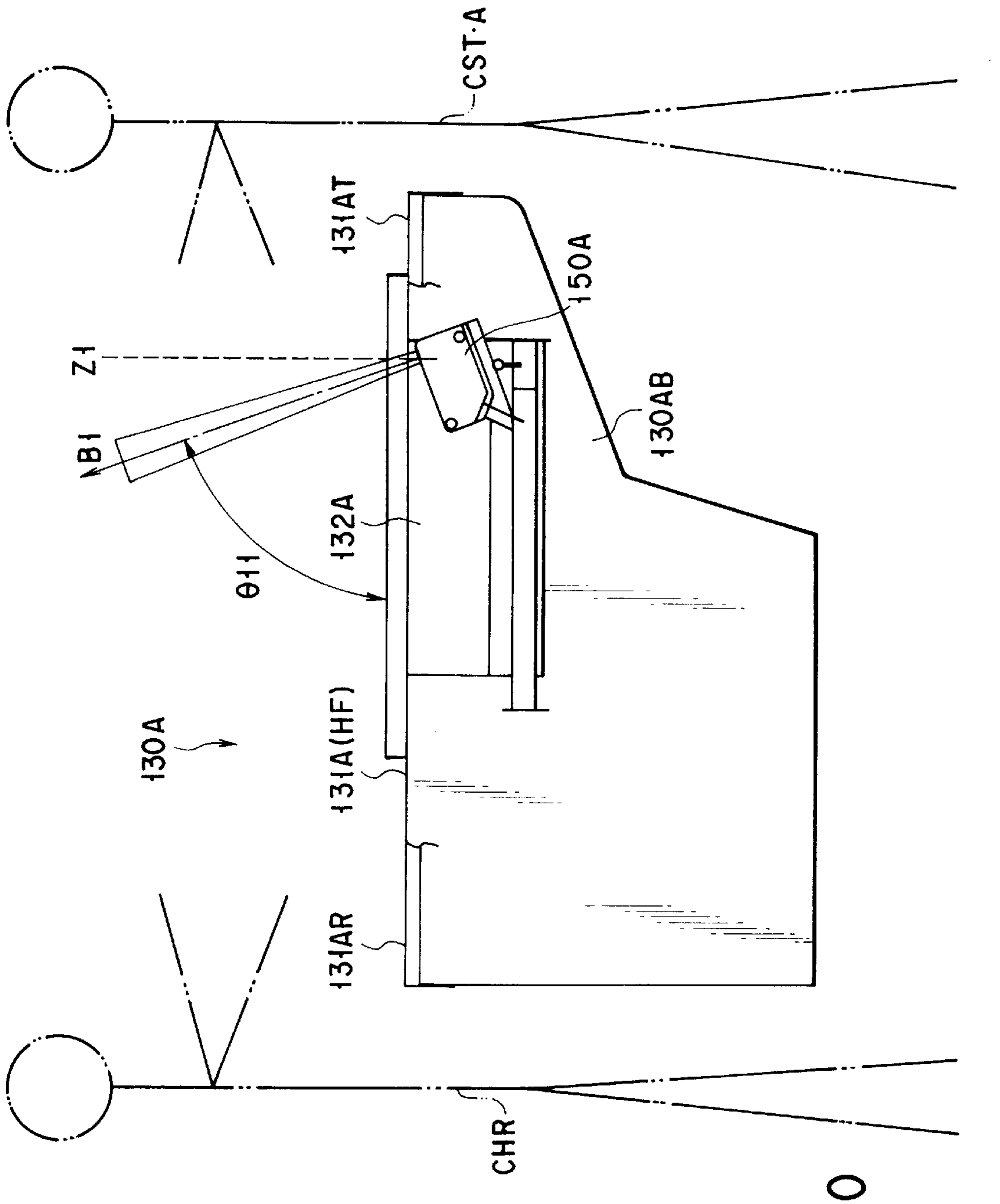
FIG. 20 is a side view of the first checkout counter from the downstream side, for illustrating the orientation of the first article sensor shown in FIG. 18.

Therefore, in the fourth embodiment, one reflection type optical detection unit 150A is disposed on the customer end side 131AT of the upper lid 131 as shown in FIG. 20 and mounted such that the first detection light beam B1 will be directed towards the opposite side 131AR of the customer end side 131AT in a direction intersecting the article moving direction XA and inclined in a direction at an angle of θ11 towards the horizontal surface HF. With this arrangement, since the detection area of the first article sensor 150A can be substantially enlarged, it is considered that the article can be stably detected by the first detection light beam B1 even if the article G is fed with its position inclined in the horizontal surface HF as shown in FIG. 24.

Further, the first article sensor 150A is mounted such that the first detection light beam B1 will be directed towards a direction opposite to the article moving direction XA as shown in FIG. 19 and inclined by an angle θ12 from the vertical axis Z1 towards the horizontal surface HF. The reason for this is to enlarge the distance L from the second detection light beam B2.

In order to stably set the angles θ11 and θ12, the first article sensor 150A is mounted on an inclination holding bracket 153 by use of screws 157 as shown in FIG. 22 and the inclination holding bracket 153 is fixed on a base member 155 which is fixed in the main body case 130AB via an intermediate plate 154 by use of a screw 158. Therefore, by replacing the inclination holding bracket 153 and intermediate plate 154, the inclined angles θ11 and θ12 can be easily set to adequate angles.

Figure 23:
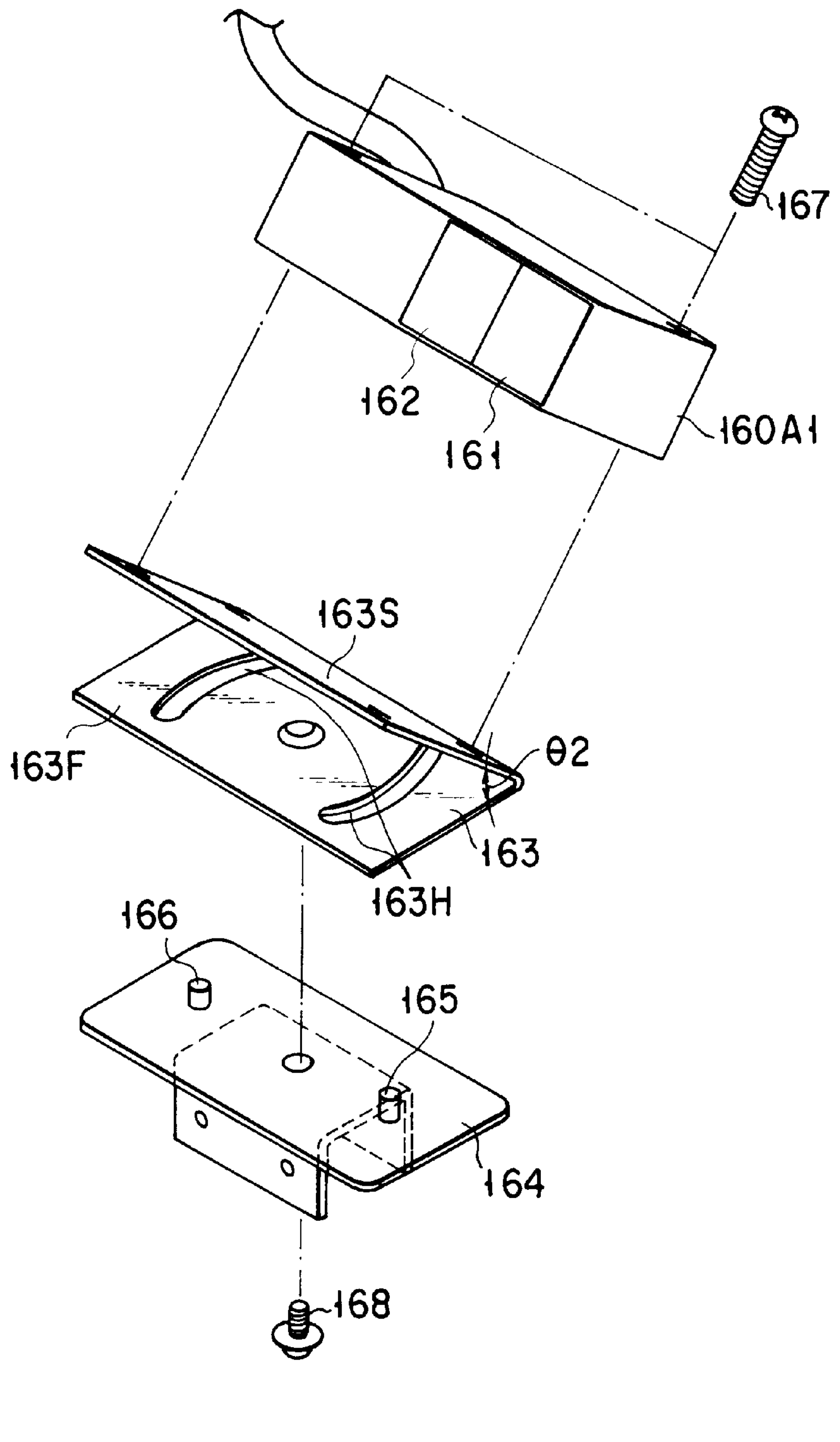
FIG. 23 is an exploded perspective view of a portion including a reflection type optical detection unit for the second article sensor shown in FIG. 18.

The second article sensor 160A is disposed on the second counter 140A side in the registering section 130A and is constructed by three reflection type optical detection units each formed of a combination of a light emitting element 161 and a light receiving element 162 as shown in FIG. 23. The mounting position thereof is set such that the second detection light B2 emitted from the light emitting element 161 will be directed towards the downstream side of the article moving direction XA and inclined in a direction at an angle of θ2 towards the horizontal surface HF as shown in FIG. 19.

That is, in order to reduce the size of the registering section 130A and the checkout counter 110A, it is most important to set the first article sensor 150A and the second article sensor 160A closer to each other in the article moving direction XA. However, if the first detection light beam B1 and second detection light beam B2 are emitted along the vertical axes Z1, Z2 shown in FIG. 19, it makes no sense to output two types of detection light beams B1 and B2 in parallel from two different positions along the article moving direction XA. From this point of view, in the conventional case, a large number of detection light beams of one type are emitted from a position along the article moving direction XA while accepting the high cost.

In this embodiment, the first article sensor 150A and the second article sensor 160A are mounted close to each other and the second detection light beam B2 is inclined by an angle θ2 shown in FIG. 19 towards the horizontal surface HF to significantly enlarge the distance L from the first detection light beam B1. The inclined angle θ2 may be preferably set in a range of 10 to 50 degrees in order to reduce the difference in level between the registering section 130A and the second counter 140A or basket CD and make it possible to stably detect that articles are thrown into the basket CD. Further, when considering that the second article sensor 160A is set inside the main body case 130AB, the inclined angle θ2 may be preferably set in a range of 20 to 45 degrees based on the relation with the inclined surface of the optical filter 134AF.

Thus, in a case where the first article sensor 150A and the second article sensor 160A are mounted close to each other and the distance L between the first detection light beam B1 and the second detection light beam B2 is enlarged, a period of time from the time when the first detection light beam B1 is applied to the article G until the second detection light B2 is applied to the article G can be set extremely long if the feeding speed of the article G in the article moving direction XA is constant Therefore, when the customer CST-A of good nature comes to know that the scanning operation is not correct, picks up the article G on the way, moves the article G in a direction opposite to the article moving direction XA and starts to scan the article again, the article is applied with the first detection light beam B1 but is not applied with the second detection light beam B2, so that the passage of the article will not be detected by the pair of article sensors 150A, 160A. Therefore, the cashier CHR can be prevented from doubting the dishonest act of the customer CST-A of good nature and giving unnecessary warning.

Further, even when the customer tries to do a dishonest act of putting the article G into the basket CD on the second counter 140A without effecting the normal self-scanning operation, the article sensors 150A, 160A can stably detect the passage of the article since the article G is applied with the second detection light beam B2 without fail even if the distance L is set relatively long. Therefore, the dishonest act can be stably prevented.

The fact that the second detection light beam B2 is directed towards the downstream side of the article moving direction XA and inclined towards the horizontal surface HF means that the second detection light beam B2 gets closer to the opening of the basket CD. Therefore, a person of the dishonest act puts or throws the article G into the basket CD via any route, the passage of the article can be detected.

Further, in order to more stably detect the passage of the article than in a case of a single reflection type optical detection unit, the second article sensor 160A is constructed by a plurality of reflection type optical detection units 160A1, 160A2, 160A3 as shown in FIG. 21. In addition, as shown in FIG. 24, the second article sensor 160A is mounted such that the second detection light beams B2 emitted from the light emitting elements 162 are more separated from one another in a direction perpendicular to the article moving direction XA as they travel farther towards the downstream side of the article moving direction XA. That is, the three second detection light beams B2 are spread in a sector form towards the downstream side so as to significantly expand the detection area. As shown in FIG. 23, each of the reflection type optical detection unit 160A1, 160A2, 160A3 is mounted on an inclined bracket 163 having an inclined portion 163S which is inclined by an angle θ2 with respect to a horizontal portion 163F by use of screws 167, and the bracket 163 is mounted and fixed on a base plate 164 which is fixed in the main body case 130AB by use of a screw 168 with adjustment grooves 163H of the bracket 163 engaged with projecting portions 165, 166 of the base plate 164.

Therefore, the angles of the second detection light beams B2 emitted from the reflection type optical detection units 160A1, 160A2, 160A3 with respect to a direction perpendicular to the article moving direction XA can be adequately adjusted and set by rotating the horizontal portion 163F relative to the base plate 164 along the adjustment grooves 163H and adjusting and setting an angle therebetween. That is, the detection area of sector form which spreads towards the downstream side can be adjusted. Further, by replacing the inclined bracket 163, the angle θ2 of the second detection light beam B2 with respect to the horizontal surface HF can be selectively set. The bending angle θ2 of the inclined bracket 163 shown in FIG. 23 is set at 40 degrees.

Figure 25:
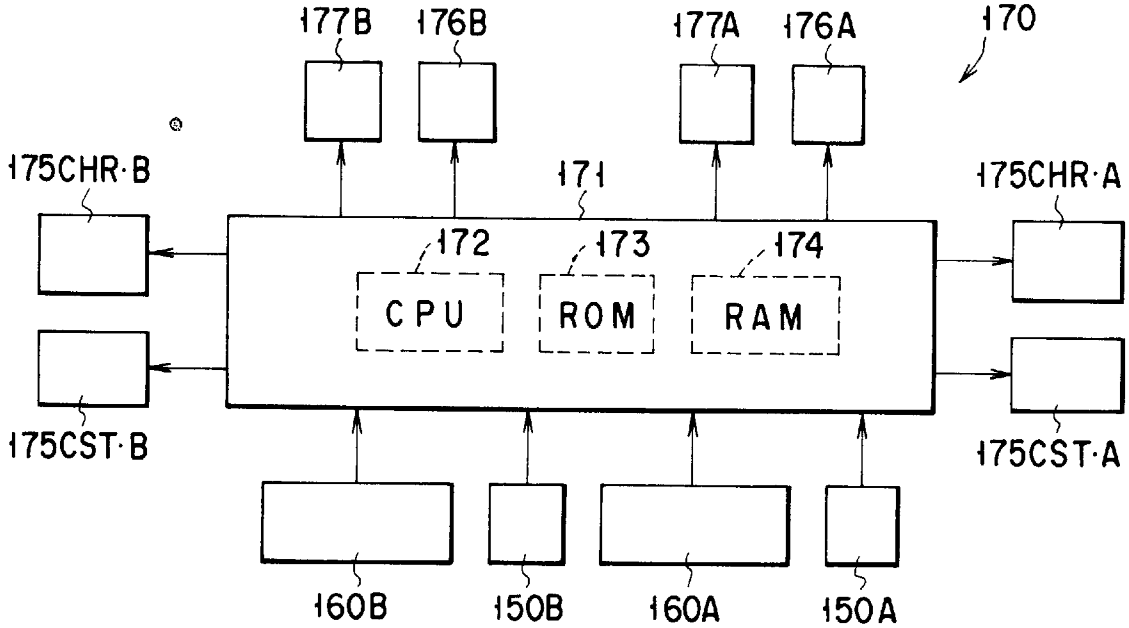
FIG. 25 is a block diagram showing a control circuit connected to the first and second article sensors shown in FIG. 18.

The control circuit 171 of the ECR 170 includes a CPU 172, a ROM 173, a RAM 174, and other components, and performs an article sales data registering process, an article movement monitoring process, and other processes. The article sensors 150A, 160A, 150B, 160B, electronic buzzers 176A, 177A, 176B, 177B, and cashier and display units 175CHR-A, 175CHR-B, 175CST-A, 175CST-B are connected to the control circuit 171. In FIG. 25, connection of the keyboards, printers, registering sections 130A, 130B, and drawer is omitted.

Figure 26:
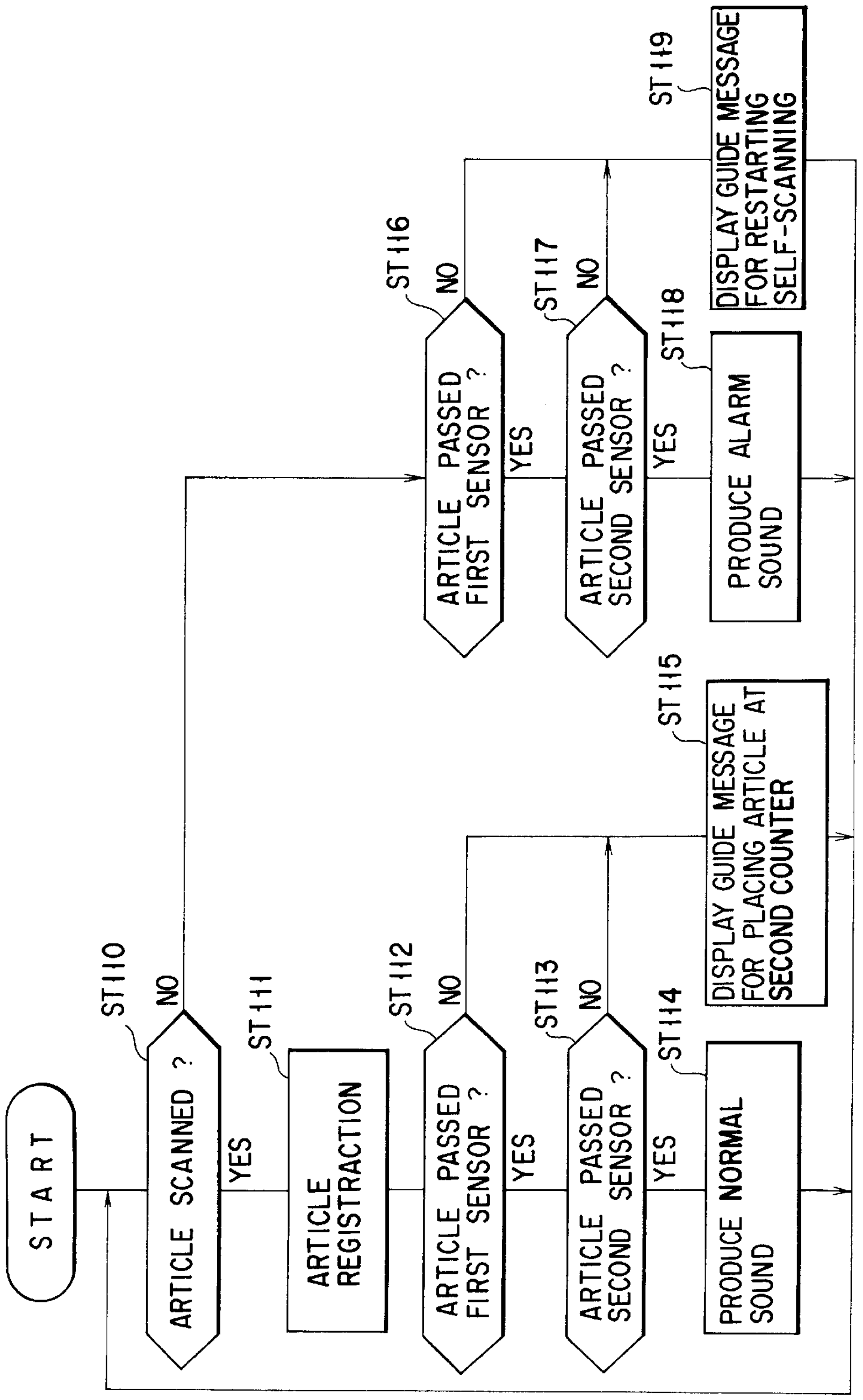
FIG. 26 is a flowchart for illustrating the article movement monitoring process of the checkout device shown in FIG. 17.

FIG. 26 shows a flow of the article movement monitoring process. The CPU 172 performs the article movement monitoring process by executing the control program stored in the ROM 173. In this monitoring process, a sound and display are generated for each article passage detection from the viewpoint of prevention of dishonest act, kind guidance for inexperienced customers in the self-scanning, attainment of smoothness and enhancement of efficiency in the whole check-out service.

That is, the CPU 172 drives the electronic buzzer 176A shown in FIG. 25 to generate a short and pleasant normal sound (ST114) when the passage of the article G which is registered (ST111) by self-scanning ("YES" in the step ST110) is detected by the first and second article sensors 150A, 160A ("YES" in the steps ST112, ST113).

When the passage of the correctly scanned article G is not detected ("NO" in the steps ST112, ST113), the instruction guidance indicating "please place the article G into basket CD on the second counter 140A" is displayed on the customer display unit 175CST-A (ST15). At this time, the same content is displayed on the cashier display unit 175CHR-A so as to permit the cashier CHR to give direct instruction.

On the other hand, when the article G is not self-scanned ("NO" in the step ST110) and the passage of the article is detected by the first and second article sensors 150A, 160A ("YES" in the steps ST116, ST117), the CPU 172 drives the electronic buzzer 177A to generate a strong alarm sound (ST118). Therefore, the cashier CHR guesses occurrence of dishonest act and can immediately give a necessary advice From this point of view, it is possible to generate a alarm sound after the second article sensor 160A detects the passage of an article ("YES" in the step ST117) even if the first article sensor 150A does not detect the passage of the article. The malicious and dishonest act can be prevented.

However, when the article is not self-scanned ("NO" in the step ST110) and the passage of the article is not detected ("NO" in the step ST116), the instruction guidance of "please start the self-scanning" or "please scan again" is displayed on the customer display unit 175CST-A. This is for simplification of the self-scanning operation.

Next, the operation of the self-scanning checkout device is explained.

When the cashier CHR turns ON the power supply switch of the checkout device shown in FIG. 17, the stationary scanner 132A of the registering section 130A is driven and a scanning beam is emitted from the scanning window 132AH shown in FIG. 18 to set up the standby state for self-scanning. Further, the first and second article sensors 150A and 160A disposed close to each other are driven.

The first detection light beam B1 emitted from the light emitting element 151 of the first article sensor 150A is inclined by the angle θ11 shown in FIG. 20 and the angle θ12 shown in FIG. 19 to define the detection area. Further, each of the second detection light beams B2 emitted from the three light emitting elements 161 of the article sensor 160A is inclined towards the downstream side by the angle θ2 as shown in FIG. 19 and defines the detection area of sector form towards the downstream side as shown in FIG. 24.

After the customer CST-A shown in FIG. 17 turns ON the start key 137AS shown in FIG. 18, she picks up the article G from the basket CU on the first counter 120A and self-scans the article by use of the scanner 132 of the registering section 130A ("YES" in the step ST110 in FIG. 26). Then, in the ECR 170, the CPU 172 of the control circuit 171 registers the article into the RAM 74 based on article information (ST111).

When the customer CST-A feeds the scanned article G which is held by hand to the downstream side of the article moving direction XA, the passage of the article is detected by the first article sensor 150A and then the passage of the article is detected by the second article sensor 160A ("YES" in the steps ST112, ST113). Then, the CPU 172 drives the electronic buzzer 176A to generate a normal sound (ST114). Therefore, the cashier CHR and customer CST-A understand that the article is registered by correct self-scanning and put into the basket CD on the second counter 140A.

At this time, even if the customer CST-A feeds the long and large article G with the position thereof inclined in the horizontal surface HF as shown in FIG. 24, the passage of the article is first detected by the first article sensor 150A without fail ("YES" in the step ST112) and then the passage of the article is detected by the second article sensor 160A ("YES" in the step ST113) since the first detection light beam B1 is inclined by the angle θ11 and the distance L between the first detection light beam B1 and the second detection light beam B2 is long. The steps 116, 117 is effected in the same manner as described above.

If the customer CST-A continuously holds the self-scanned article G, the instruction guidance that the article should be placed into the basket CD on the second counter 140A is displayed on the customer display unit 175CST-A (ST115). In this case, the customer CST-A can confirm that the self-scanning operation is correctly effected and immediately place the article into the basket CD.

However, when the customer CST-A self-scans the 15 article but the scanning operation ends in failure for some reason ("NO" in the step ST110) and if the result in the steps ST116 and/or ST117 is "NO", that is, the passage of the article is not detected, the instruction guidance of re-scanning is displayed on the customer display unit 175CST-A (ST119). When the start key 137AS is turned ON, the instruction guidance of starting of the self-scanning is displayed (ST119).

Further, when the customer comes to know that the scanning operation ends in failure and moves the article back to the scanner 132A of the registering section 130A after the passage of the article G is detected by the first article sensor 150A ("YES" in the step ST116), the passage of the article is not detected by the article sensors 150A, 160A ("NO" in the step ST117) since the distance L between the first detection light beam B1 and the second detection light beam B2 is long as shown in FIG. 19. In this case, the alarm sound indicating the possibility of occurrence of dishonest act (ST118) is not generated. Thus, even if the customer CST-A of good nature is inexperienced in the self-scanning operation, no caution will be given as warning to the dishonest act.

When the customer CST-A turns ON the end key 137AE after correctly self-scanning all of the articles purchased, the CPU 172 calculates the total amount based on article registration data and displays the result on the customer display unit 175CST-A and cashier display unit 175CHR-A. After this, when the customer CST-A puts cash corresponding to the total amount on the cash receiving tray 136A and receives the change if any, the accounting process is completed. Then, the customer CST-A carries the basket CU and the check-out is completed.

Next, a case wherein a customer (CST-A) of bad nature places an article G into the basket CD on the second counter 140A without permission without correct self-scanning is explained.

When the article G is fed along the article moving direction XA, the passage of the article is detected by the first article sensor 150A based on the first detection light beam B1 ("YES" in the step ST116 in FIG. 10). Then, the passage of the article is detected by the second article sensor 160A based on the second detection light beam B2 ("YES" in the step ST117). At this time, since the second detection light beam B2 is inclined by the angle θ2 towards the horizontal surface HF on the downstream side and the three second detection light beams B2 are spread in a sector form to cover the opening of the basket CD, the passage of the article can be more stably detected.

Then, the CPU 172 activates the electronic buzzer 177A to generate an alarm sound (ST118). The cashier CHR easily guesses occurrence of the dishonest act. Therefore, the cashier can give an adequate and strict advice based on the fact to a person of dishonest act by comparing the number of articles registered with the number of articles contained in the basket CD, for example. Thus, the intentional dishonest act can be completely prevented. It is also effective to previously prevent next occurrence of dishonest act by generating a strong alarm sound.

The alarm sound is generated when the customer CST-A of good nature throws the article into the basket CD without knowing that the self-scanning operation ends in failure. However, even in this case, the possibility of the customer CST-A to have guilt feelings that she carried away the articles for which payments are not made can be eliminated, and generation of the alarm sound is effective.

The operation of the checkout counter 110B is the same as that of the checkout counter 110A described above, and therefore, explanation for the operation is omitted.

Thus, according to the fourth embodiment, the first article sensor 150A is disposed on the scanner 132 side in the registering section 130A and the second article sensor 160A disposed on the second counter 140A side The first and second article sensors 150A and 160A are disposed close to each other in the article moving direction XA. The first article sensor 150A is constructed by a single reflection type optical detection unit formed of a combination of the light emitting element 151 and the light receiving element 152, and the second article sensor 160A is constructed by a plurality of reflection type optical detection units each formed of a combination of the light emitting element 161 and the light receiving element 162. Each reflection type optical detection unit of the second article sensor 160A is mounted such that the detection light beam B2 emitted from the light emitting element 161 is directed towards the downstream side of the article moving direction XA and inclined in a direction towards the horizontal surface HF by an angle θ2. Therefore, the size of the apparatus can be reduced by disposing the first and second article sensors 150A and 160A close to each other in the article moving direction XA. Further, it is possible to make it difficult to detect the passage of an article which is not self-scanned by the customer of good nature and make it possible to stably detect the passage of an article which is not self-scanned and dishonestly placed on the second counter 140A without permission by enlarging the distance L between the second detection light beam B2 and the first detection light beams B1 emitted from the the light emitting element 151 of the first article sensor 150A, and the checkout device can be constructed to be small, light in weight and inexpensive.

Further, since each of the second detection light beams B2 is inclined in a direction by the angle θ2 towards the horizontal surface HF, a detection area which covers the opening of the basket CD can be defined, and therefore, the article can be stably detected even when the article G is thrown into the basket or put into the basket via the roundabout route.

Also, since each of the reflection type optical detection units 160A1, 160A2, 160A3 of the second article sensor 160A is mounted via the inclined holding bracket 163 shown in FIG. 23, the inclined angle θ2 from the horizontal surface HF can be easily adjusted, thereby increasing the applicability thereof.

Since the frame 135A constructing the second detection window 134A is formed in a triangular form, a difference in level between the registering section 130A and the second counter 140A can be made small and the first detection window 133A can be prevented from being covered with an article G or the like. Therefore, the detecting operation of the first article sensor 150A can be ensured.

Further, since generation of the normal sound (ST114 in FIG. 26), alarm sound (ST118) and display of the instruction guidance (ST115, ST119) are effected according to a signal generated as the result of detection of passage by the article sensors 150A, 160A, the dishonest act can be stably prevented, a kind and good advice can be given to a person who is inexperienced in self-scanning, a smooth and fast accounting process can be effected by one cashier CHR for two customers CST-A and CST-B on the two checkout counters 110A, 110B and mental pressure for prevention of the dishonest act is not imposed on the cashier.

The second article sensor 160A is constructed by a plurality of reflection type optical detection units 160A1, 160A2, 160A3 each formed of a combination of the light emitting element 161 and the light receiving element 162. These optical detection units 160A1, 160A2, 160A3 are mounted such that the second detection light beam B2 emitted from the light emitting element 161 will be directed towards the downstream side of the article moving direction XA and inclined in a direction towards the horizontal surface HF by an angle θ2, and the second detection light beams B2 are more separated from one another as shown in FIG. 24 in a direction perpendicular to the article moving direction XA as they travel farther towards the downstream side of the article moving direction XA. Therefore, the passage of the article can be stably detected by at least one of the second detection light beams B2 even when the article G is thrown onto the second counter 140A or put on the second counter via a roundabout route and the dishonest act that an article which is not self-scanned is placed on the second counter 140A can be prevented.

Since the reflection type optical detection units 160A1, 160A2, 160A3 are mounted via the rotation adjustment mechanism 163, 163H, 165, 166 shown in FIG. 23, the detection area of sector form can be adjusted to be expanded or narrowed so that the applicability can be enhanced and the passage of the article can be more stably detected.

Further, since the second article sensor 160A may be constructed by three reflection type optical detection units 160A1, 160A2, 160A3, the cost can be significantly lowered in comparison with the conventional case.

Also, the first article sensor 150A constructed by one reflection type optical detection unit is arranged on the customer end side 131AT of the scanner 132A in the registering section 130 and mounted such that the first detection light beam B1 emitted from the light emitting element 151 will be directed towards the opposite side 131AR of the customer's end side 131AT in a direction intersecting the article moving direction XA and inclined in a direction towards the horizontal surface HF by an angle θ11. Therefore, the cost can be further lowered, an article G fed in the article moving direction XA can be stably detected by one first detection light beam B1 even if the position thereof is inclined in the horizontal surface HF, and the self-scanning operation can be further simplified.

Since the inclination of the article sensor 150A can be adjusted by means of the bracket 153 shown in FIG. 22, the angle θ11 can be easily adjusted by replacement of the inclination holding bracket 153, and therefore, the applicability can be enhanced.

Since the first detection light beam B1 is inclined not only by the angle θ11 but also by the angle θ12, the distance L can be made longer.

In the fourth embodiment, the first article sensor 150A is constructed by one reflection type optical detection unit, but the first article sensor 150A may be constructed to utilize scanning light output from the stationary scanner 132A of the registering section 130A.

There will now be described a self-scanning checkout device according to a fifth embodiment of this invention with reference to the accompanying drawings.

Figure 27:
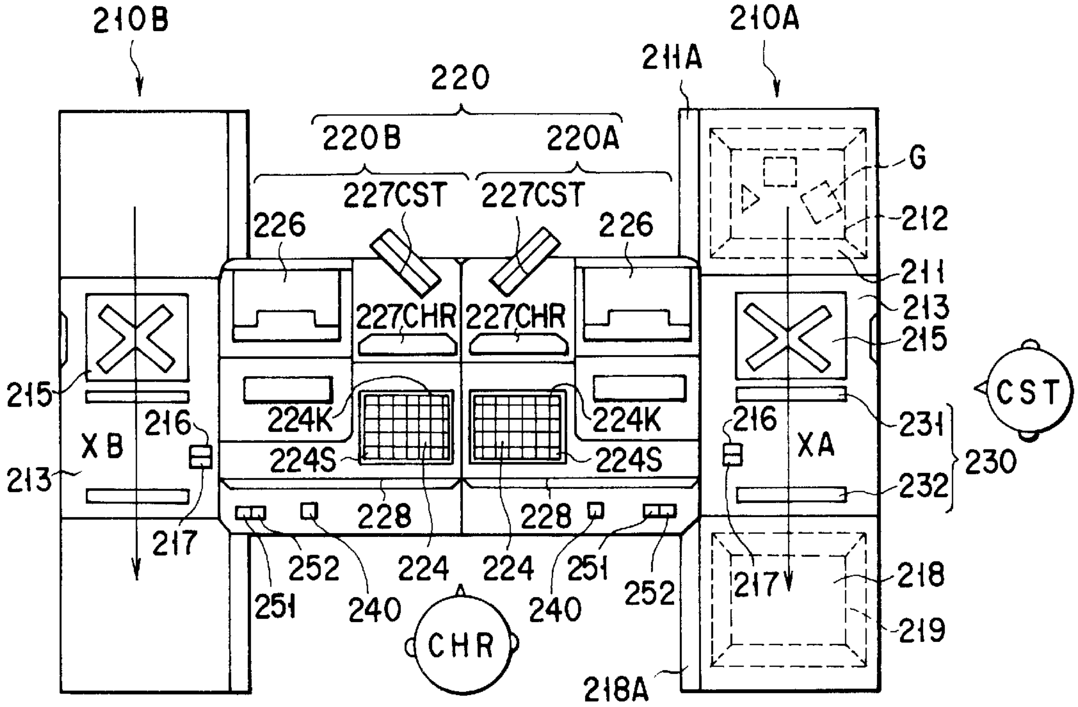
FIG. 27 is a plan view showing the whole construction of a self-scanning checkout device according to a fifth embodiment of this invention.

FIG. 27 shows the whole construction of the self-scanning checkout device. This checkout device is of a two-lane type in which two checkout counters 210A, 210B are arranged in parallel and a settlement section 220 having two electronic cash registers (which are hereinafter referred to as ECRs) 220A, 220B is disposed between the checkout counters.

Each of the checkout counters 210A, 210B has a first counter 211 used as an unregistered article placing section on which unregistered purchased articles are placed and disposed on the upstream side of the article moving direction (direction indicated by an arrow XA in FIG. 27) and a second counter 218 used as a registered article placing section on which registered purchased articles are placed and disposed on the downstream side with a registering section (input section) 213 disposed between the first and second counters. Customer's paths (checkout lanes) along which customers walk are created outside the checkout counters 210A, 210B.

The first and second counters 211 and 218 are formed lower than the registering section 213, and when a shopping basket 219 provided in the store is placed on the counter 211 or 218, the upper level of the basket 219 is substantially aligned with the top surface of the registering section 213. Further, side plates 211A, 218A are provided on the internal sides of the counters 211, 218 so as to prevent the basket 219 from falling on the settlement section 220.

In the registering section 213, stationary scanners 215 used as article information reading means for optically reading a bar code affixed to an article are buried near the first counters 211 of the respective counters 210A, 210B. Further, two downstream side article sensors 231, 232 (which are hereinafter referred to as first article sensor 231 and second article sensor 232) are fixed in substantially the same plane as the reading surface of the stationary scanner 215 and on the downstream side from the reading surface along the article moving direction XA. The article sensors 231, 232 serve as an article passage detection section 230.

The sensors 231, 232 are of a light reflection type and generate sensor-ON signals (article detection signals) when an article passes a position directly above the sensors. For example, the first article sensor 231 is fixed near the stationary scanner 215 between the stationary scanner 215 and the second counter 218, and the second article sensor 232 is fixed near the second counter 218 between the stationary scanner 215 and the second counter 218. Further, a scanning start key 216 and a scanning end key 217 is disposed between the stationary scanner 215 and the second counter 218.

Figure 28:
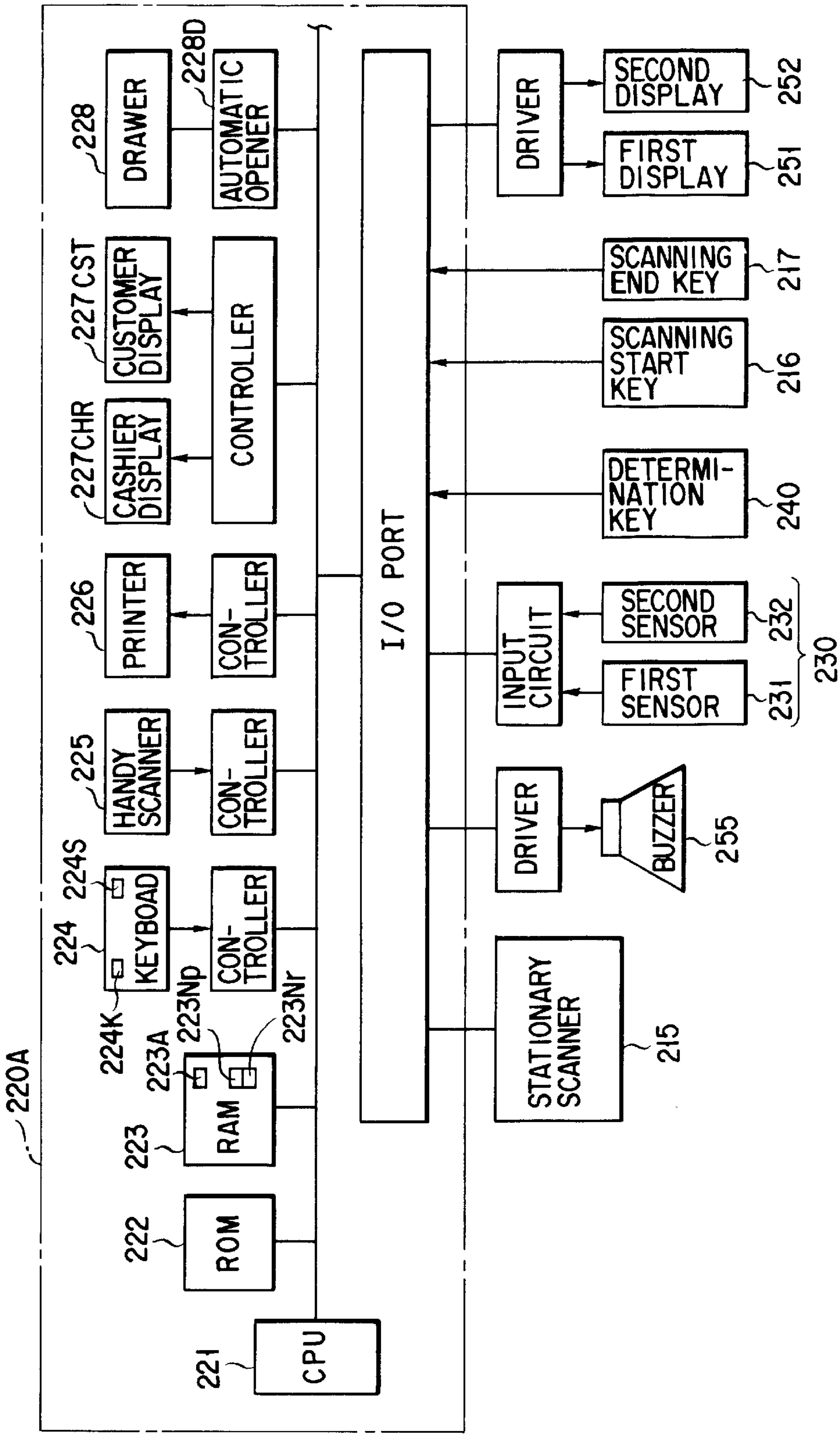
FIG. 28 is a block diagram for illustrating an electronic cash register shown in FIG. 27.

Each of the ECRs 220A, 220B in the settlement section 220 includes a control circuit constituted by a CPU 221, a ROM 222, a RAM 223, a keyboard 221, a cashier display unit 227CHR, a customer display unit 227CST, a printer 24, a handy scanner 25, an input/output port 229, and other components connected as shown in FIG. 28. The keyboard 224, the keyboard 224, the cashier display unit 227CHR, the customer display unit 227CST, the printer 226 and the handy scanner are connected to the CPU 221 via corresponding controllers. Further, the CPU 221 is connected to a drawer 228 via an automatic opener 228D for opening the drawer 228. The input/output port 229 is connected directly to the scanning start key 216, the scanning end key 217, a determination key 240, and the stationary scanner 215, to the buzzer 255, the first display 251, and the second display 252 via drivers, and to the first article sensor 231 and the second article sensor 232 via an input circuit. The determination key 240, the first display unit 251, the second display unit 252 are disposed on the cashier side. The ECRs 220A and 220B can effect the article registration and accounting process based on article information input via the stationary scanner 215. Further, the cashier CHR can input article information by use of the keyboard 224 or handy scanner 225. The ECRs 220A and 220B can be modified to have one control circuit and one drawer used commonly.

As shown in FIG. 27, the article passage detection section 230 includes the first and second article sensors 231 and 232 constructed by reflection type optical detection units each of which is formed of a combination of a light emitting element and a light receiving element, and can detect the passage of an article directly or via a hand of the customer CST.

The reason why the two article sensors 231, 232 are serially and separately arranged in the article moving direction XA is to attain a first object of preventing detection of the passage of an article when the customer comes to know that the self-scanning operation ends in failure and moves back the article G to the stationary scanner 215, a second object of permitting more stable detection of the passage of the article G even when the article G is thrown into the basket 219 on the second counter 218, and a third object of markedly reducing the number of reflection type optical units each formed of a combination of a light emitting element and a light receiving element and reducing the cost in comparison with the conventional case.

In this embodiment, as shown in FIG. 28, each of the sensors 231, 232 outputs an sensor-ON signal (article passage detection signal) to the CPU 221 of the control circuit via the input circuit and input/output port 229.

Figure 29:
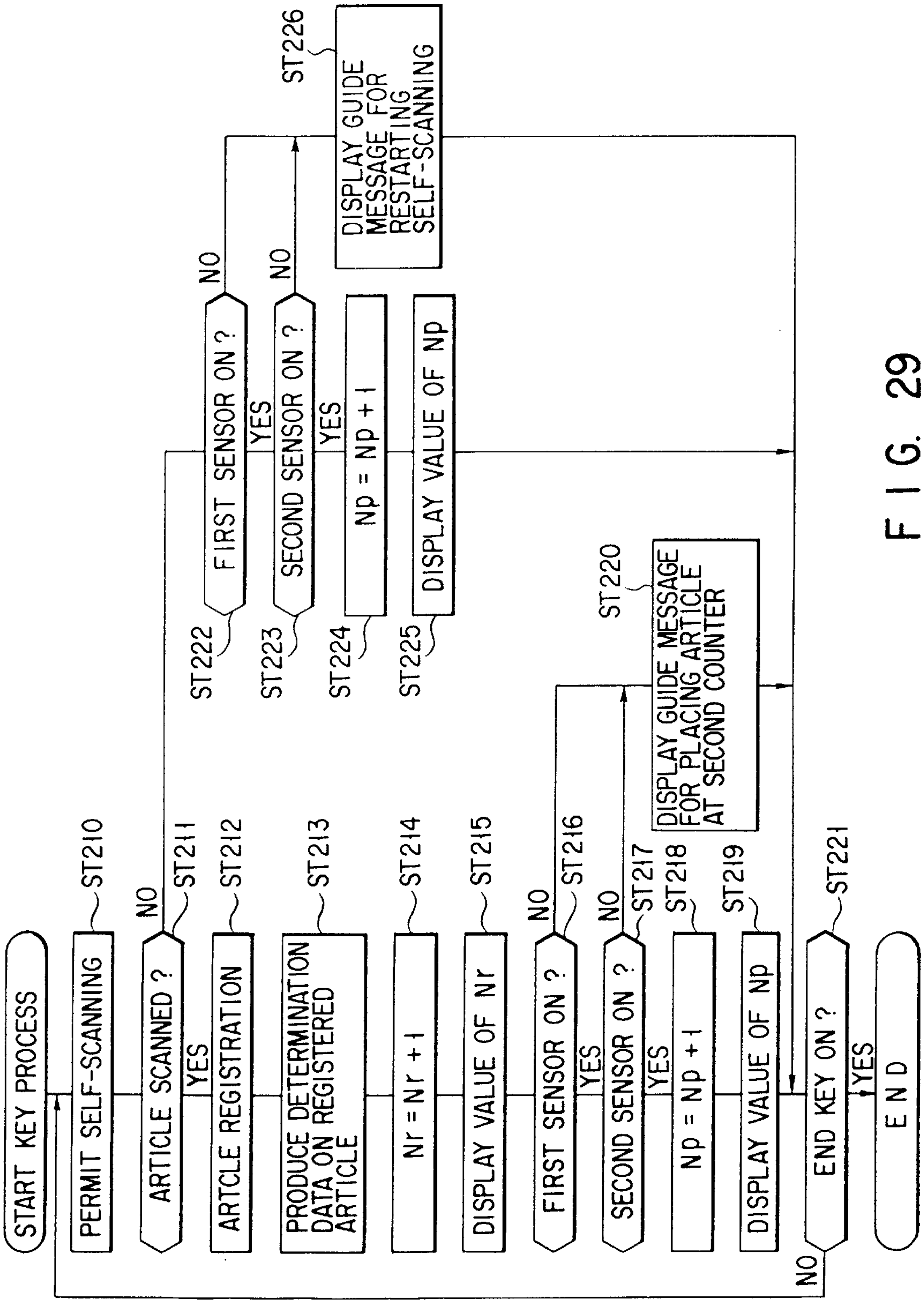
FIGS. 29 and 30 are flowcharts for illustrating the operation of the checkout device shown in FIG. 27.

The CPU 221 performs a control process by executing a program stored in the ROM 223, and serve as article scanning number counting means, article passage detection number counting means, number coincidence determination means, error signal output control means, first display control means, second display control means, permissible number setting means, permissible range determination means, error signal output operation inhibiting controlling means, registered article determination data creation means, registered article determination receipt issuance instruction means, guidance display control means, flickering display control means, buzzer sounding control means, difference number calculating means, and other means The article scanning number counting means is a means for counting the number Nr of self-scanning operations effected by use of the stationary scanner 215 and is obtained by executing the step ST214 in FIG. 29.

That is, when the customer CST turns ON the start key 216, the self-scanning operation is permitted by the CPU 221 (ST210 in FIG. 29). After this, when the self-scanning operation is effected by use of the stationary scanner 215 ("YES" in the step ST211), the CPU 221 registers the article into the RAM 223 based on article information (ST212). At this time, the CPU 221 counts the article scanning number (which is equal to the article registration number) Nr (ST214). The counted article scanning number Nr is stored in a count memory 223Nr of the RAM 223.

Figure 31A:
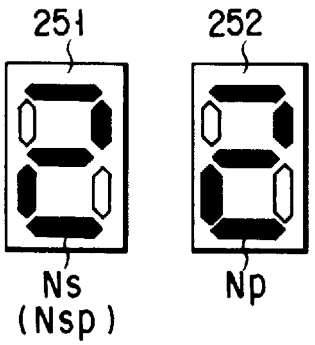
FIGS. 31A and 31B are views for illustrating examples of values displayed on first and second display units shown in FIG. 27.

The counted article scanning number Nr is displayed on the first display unit 251 by the first display control means constructed by the CPU 221 and the ROM 222 which stores a display program (ST215). More specifically, for example, "2" is displayed in a digital form as shown in FIG. 31A. The counting operation is continued until the termination key 217 is turned ON (ST221).

The article passage detection number counting means is a means for counting the article passage detection number Np of the article G whose passage is detected by the sensors 231, 232 and is obtained by executing the steps ST224 and ST218 in FIG. 29.

That is, when the passage of the article G which is correctly self-scanned ("YES" in the step ST211 and the step ST212) is detected by both of the first sensor 231 and the second sensor 232 ("YES" in the steps ST216, ST217), the counting operation (Np=Np+1) is effected in the step ST218. When the passage of the article G which is not self-scanned is detected by both of the first sensor 231 and the second sensor 232 ("YES" in the steps ST222, ST223), the counting operation (Np=Np+1) is effected in the step ST224. The counted article passage detection number Np is stored in the count memory 223Np in the RAM 223. That is, irrespective of the article G which is self-scanned or which is not self-scanned, the counting operation is effected when the passage of the article is detected.

The thus counted article passage detection number Np is displayed on the second display unit 252 by the second display control means (steps ST219, ST225). As shown in FIG. 31A, for example, "2" is displayed in the digital form As shown in FIG. 27, the first display unit 251 and the second display unit 252 are disposed close to each other to simplify the comparison, collation and determination.

When the article G which is detected by the first sensor 231 is moved back towards the stationary scanner 215 before it is detected by the second sensor 232, the article passage detection section 230 (231, 232) does not detect the passage of the article ("NO" in the steps ST217, ST223), and therefore, the article passage detection number Np is not counted up. This is because there is no possibility of dishonest act of placing the article G on the second counter 218.

The guidance display control means displays the guidance that the article G should be placed on the second counter 218 on the customer display unit 227CST (ST220) when the self-scanning operation is correctly effected, and display the guidance that the scanning operation should be effected again is displayed (ST226) when the self-scanning operation is not effected. When the start key 216 is turned ON, the guidance "please start the self-scanning operation" is displayed (ST226).

Figure 30:
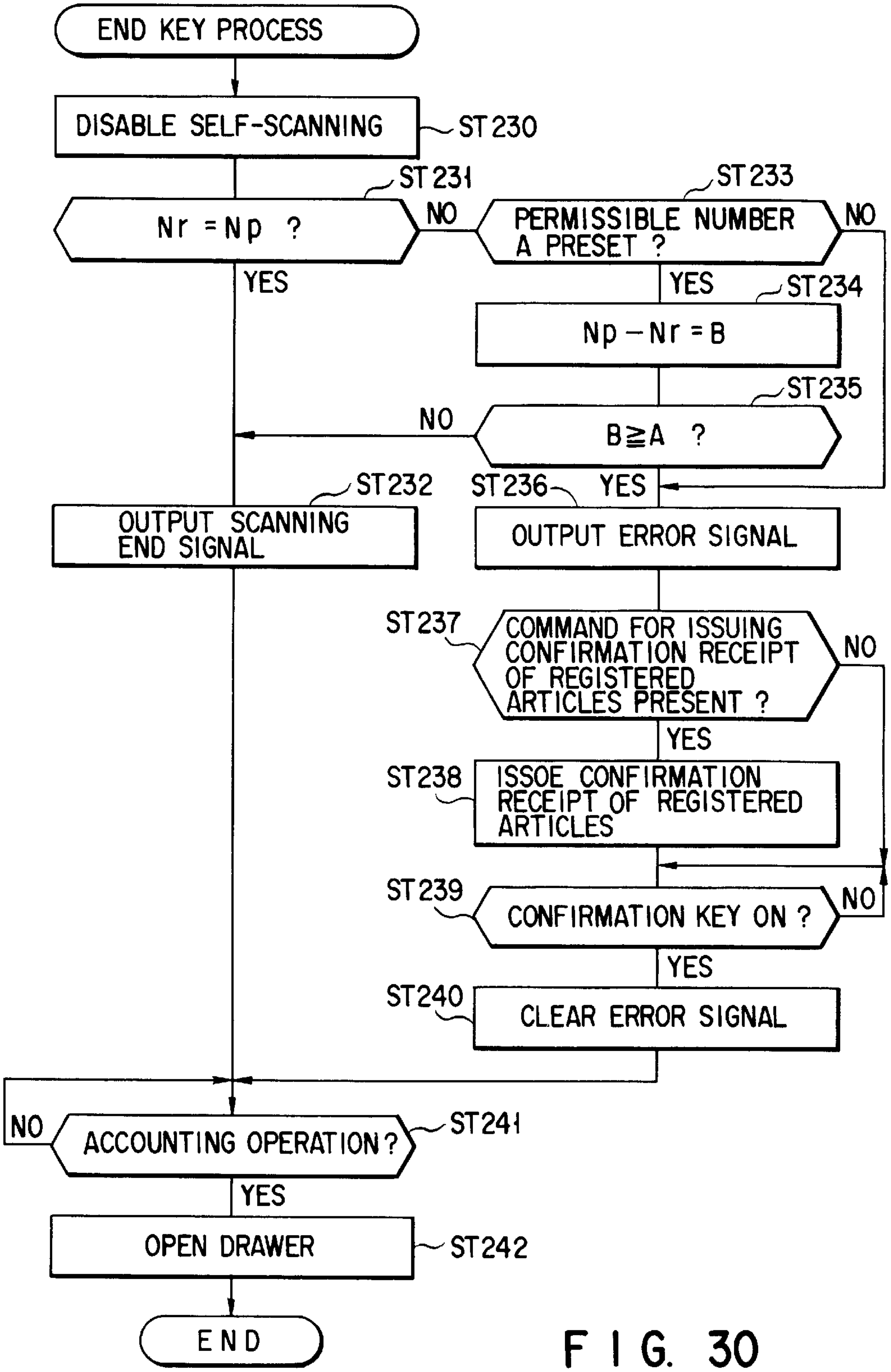

The number coincidence determination means is a means for comparing the counted article scanning number Nr with the article passage detection number Np to determine whether the compared numbers coincide with each other or not, and is obtained by executing the step ST231 in FIG. 30.

That is, when the end key 217 is turned ON and the self-scanning operation is inhibited by the CPU 221 (ST230), that is, the self-scanning operation for one transaction is completed, the article scanning number Nr stored in the count memory 223Nr and the article passage detection number Np stored in the count memory 223Np are read out and whether they are coincident with each other (Nr=Np) or not is determined.

When it is determined that Nr=Np ("YES" in the step ST231), the CPU 221 outputs a self-scanning end signal (ST232). As a result, the settlement operation by use of the keyboard 224 is permitted ("YES" in the step ST241), the total amount is automatically calculated and the drawer 228 is automatically opened (ST242). Thus, the accounting operation can be effected.

However, when it is determined that Nr is different from Np ("NO" in the step ST231), the error signal output control means is operated to output an error signal (ST236). In this embodiment, when an error signal is output, it is determined that the dishonest act is done. At this time, the buzzer sounding control means activates the buzzer 55, and the error display control means displays the error on the cashier display unit 227CHR (ST236). Thus, the cashier CHR may ask the customer CST for confirmation and can immediately determine whether or not an article G which is not scanned is contained in the articles actually placed on the second counter 218. That is, it is possible to guess whether the dishonest act is done or not on the checkout counter 210A even when the accounting operation is being effected on the checkout counter 210B.

The number coincidence determining means may be required only to determine coincidence between the article scanning number Nr counted so far and the article passage detection number Np after the self-scanning operation is completed in one transaction as shown in the step ST231 in FIG. 30 in relation to the error signal output control means, but in this embodiment, it is designed to compare Nr and Np with each other and determine the coincidence between them each time the self-scanning operation is effected in relation to flickering display control means.

Figure 31B:
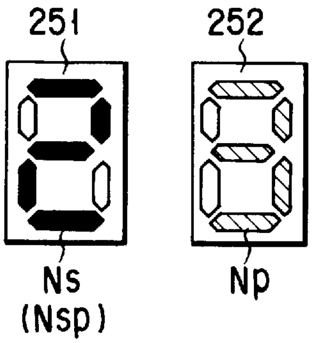

That is, the flickering display control means is designed to flicker the content (Np) displayed on the second display unit 252 by the second display means, for example, "3" hatched in FIG. 31B when the article scanning number Nr and the article passage detection number Np are different from each other. Therefore, the cashier CHR can monitor and guess whether the dishonest act is done or not even before all the self-scanning operation for one transaction is completed. In addition, it is possible to use the flickering display as information for kindly instructing an inexperienced customer CST how to effect the correct operation method. Further, the flickering display control means is designed to provide flickering display in response to an error signal.

The error signal is turned out (ST240) when the determination key 240 is turned ON ("YES" in the step ST239). That is, the duty of preventing the dishonest act based on concrete determination is imposed on the cashier CHR. Further, in this embodiment, the drawer open inhibition control means is operated to inhibit the drawer 228 from being opened while the error signal is being output.

The permissible number setting means is a means for setting a permissible number A to smoothly and adequately prevent the dishonest act without excessive reaction in the actual application and make it unnecessary to provide unnecessary warning to the customer CST of good nature or the customer inexperienced in the self-scanning, and is constructed by a setting key 220S on the keyboard 224. The setting key 220S is constructed by numeral keys or the like and the set permissible number A is stored in the setting memory 23A in the RAM 223 by the CPU 221.

The difference number calculating means is a means for calculating a difference number B between the article passage detection number Np counted by the article passage detection number counting means and the article scanning number Nr counted by the article number counting means after the self-scanning operation for one transaction is completed, and is obtained by executing the step ST214 of FIG. 30. That is, the difference number B is calculated (B=Np−Nr) when the permissible number A which is previously set by the permissible number setting means 224S is stored in the setting memory 223A ("YES" in the step ST233).

The permissible range determining means is a means for comparing the calculated difference number B with the set permissible number A to determine whether the calculated difference number B is less than the set permissible number (A), and is obtained by executing the step ST235 of FIG. 30.

That is, the difference number B becomes 0 when all of the articles G are correctly self-scanned and the passage of all of the correctly self-scanning articles is correctly detected, but particularly when the customer CST is inexperienced in the self-scanning, an article which is correctly self-scanned may be fed to the second counter 218 (219) without malicious intention, and Np>Nr and the difference number B takes an integral number. This is because the article passage detection number Np is counted even if the article is correctly self-scanned after this. That is, if the above case is unconditionally determined as occurrence of the dishonest act, the feelings of the customer CST are hurt, thus preventing the smooth check-out. On the other hand, if no attention is paid to the magnitude of the difference number B, the dishonest act of malicious intention which must be strictly watched cannot be monitored.

In order to provide adequate services by taking various conditions of customers into consideration, the permissible range determining means is provided to output an error signal (ST236) when the calculated difference number B is equal to or larger than the permissible number A set as the permissible range ("YES" in the step ST235), but prevent output of the error signal when the calculated difference number B is smaller than the permissible number A ("NO" in the step ST235).

Thus, the error signal output operation inhibiting controlling means inhibits the error signal output operation (ST236) of the error signal output control means when it is determined that B<A by the permissible range determining means. That is, it is determined that the self-scanning operation in one transaction is correctly effected, and a self-scanning completion signal is output (ST232) and the accounting operation is permitted (ST241, ST242).

In principle, the dishonest act of malicious intention must be strictly watched. However, it is too strict to take a strong attitude towards the customer CST, and particularly, give warnings to the customer without any evidence just because the buzzer 255 is activated by the error signal.

For this reason, a registered article determination receipt 300 is issued. That is, the registered article determination data creation means is a means for editing registration data based on article information input by use of the stationary scanner 215 to create registered article determination data and is obtained by executing the step ST213 of FIG. 29. The registered article determination data contains data relating to the self-scanned articles and article information input by use of the keyboard 224 or handy scanner 225 by the cashier CHR.

The registered article determination receipt issuance instruction means is a means for instructing issuance of the registered article determination receipt 300 and is constructed by the setting key 224K of the keyboard 224 to issue an issuance instruction when the setting key 224K is turned ON. In this embodiment, the issuance instruction is stored in the work area of the RAM 223. Therefore, the issuance instruction can be issued at any time before or after the buzzer 255 is activated by the error signal.

The registered article determination receipt printing/issuing control means is a means for driving the printer 226 if the issuance instruction is issued ("YES" in the step ST237 of FIG. 30) to issue the registered article determination receipt 300 on which registered article determination data is printed and is obtained by executing the step ST238.

Figure 32:
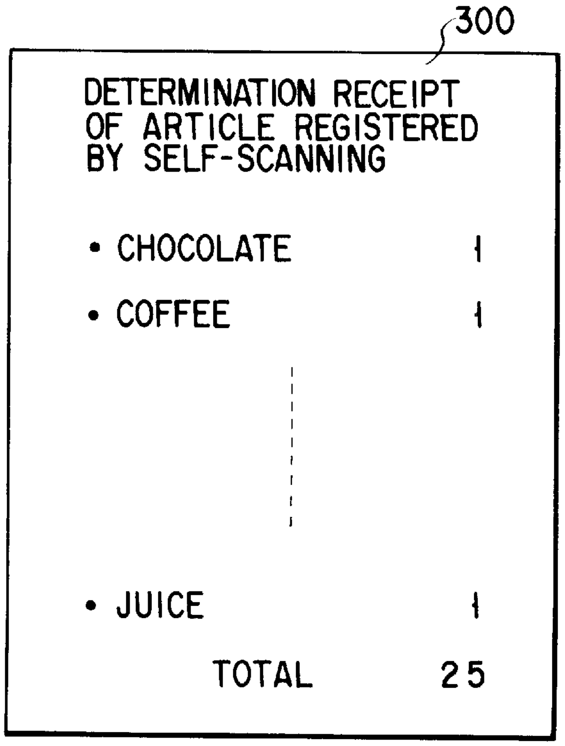
FIG. 32 is a view for illustrating an example of a registered article determination receipt issued by the electronic cash register shown in FIG. 27.

That is, when the CPU 221 determines that the issuance instruction is issued ("YES" in the step ST237), it reads out registered article determination data created by the registered article determination data creation means and stored in the work area of the RAM 223 and drives the printer 226 to print and issue the registered article determination receipt 300 shown in FIG. 32. On the receipt 300, the article name (for example, chocolate), the number of the articles (for example, 1) and the total number (for example, 25) are printed. Therefore, whether or not an article G which is not scanned is contained in the articles placed into the basket 219 on the second counter 218 can be objectively and concretely checked by using the registered article determination receipt 300 as evidence.

Next, the operation of the self-scanning checkout device is explained.

In FIG. 27, when the customer CST on the checkout counter 210A side turns ON the start key 216, the CPU 221 of the electronic cash registers 220A permits the self-scanning by use of the stationary scanner 215 on the checkout counter 210A side (ST110 of FIG. 29). When the customer CST picks up a first article G from the basket 212 on the first counter 211 and self-scans the article ("YES" in the step ST211), the article is registered based on the article information (ST212).

At this time, the registered article determination data creating means creates registered article determination data (for example, chocolate×1) based on the registration data and stores the same into the work area of the RAM 223. Further, the article scanning number counting means counts the article scanning number Nr (ST214). The article scanning number Nr is stored in the count memory 223Nr. At substantially the same time, the first display control means is operated to display the article scanning number Nr in a digital form on the first display unit 251 as shown in FIG. 31A (ST215). The display content at this time is "1".

When the customer CST feeds the article G in the article moving direction XA towards the basket 219 on the second counter 218, the first sensor 231 is activated ("YES" in the step ST216) and then the second sensor 232 is activated ("YES" in the step ST217). That is, the article passage detection section 230 detects the passage of the article. Then, the article passage detection number counting means counts the article passage detection number Np (ST218). The count number (Np) is stored in the count memory 223Np. The second display control means displays the article passage detection number Np on the second display unit 252 shown in FIG. 31A (ST219). In this case, the display content is "1".

Therefore, the number coincidence determining means determines that Ns=Np. However, for example, when the article scanning number Ns is "2" and the article passage detection number Np is "3", it determines that Ns and Np are different from each other. Then, the flickering display control means is operated and flickers the article passage detection number Np (=3) displayed on the second display unit 252 as shown in FIG. 31B. The article scanning number Ns (=2) displayed on the first display unit 251 is kept lighted. Thus, the cashier CHR can determine whether the customer CST is inexperienced in the self-scanning operation or the customer has done the dishonest act before the scanning operation for one transaction is completed.

The article passage detection number counting means counts the article passage detection number Np (ST224) when the article passage detection section 230 detects the article G ("YES" in the steps ST222, ST223) even if the article is self-scanned ("NO" in the step ST211). The display content of the second display unit 252 is changed (ST225). The registration process for the article G which is handed over from the customer CST to the cashier CHR and is registered by use of the handy scanner 225 or keyboard 224 instead of effecting the self-scanning operation is effected in the steps ST218, ST219.

When the customer CST forgets or takes a long time to place the article G registered (ST212) by the self-scanning into the basket 219 on the second counter 218, the guidance display control means is operated to display a guidance (ST220). When the self-scanning operation is delayed, the same display is made (ST226). Therefore, the customer CST can smoothly effect the guidance displayed on the customer display unit 227CST.

When the customer CST turns ON the end key 217 to complete the self-scanning for one transaction, the CPU 221 inhibits the succeeding scanning operation (ST230 in FIG. 30). At this time, the number coincidence determining means reads out the article scanning count number Nr stored in the count memory 223Nr and the article passage detection number Np stored in the count memory 223Np after completion of the self-scanning for one transaction to determine whether they coincide with each other or not (ST231). If Nr=Np, the CPU 221 outputs a self-scanning end signal (ST232) and permits the accounting operation.

Therefore, the cashier CHR effects the settlement operation by use of the amount tendered/total key, for example, on the keyboard 224 ("YES" in the step ST241). As a result, the total amount is calculated and displayed on the display units 227CST and 227CHR and a normal receipt is issued by the printer 26. Further, the drawer 228 is automatically opened (ST242). Thus, the accounting operation including reception of cash is effected and the check-out is terminated.

When the number coincidence determining means determines that Nr is different from Np ("NO" in the step ST231), the error signal output control means is operated to output an error signal (ST236). That is, the buzzer 255 is activated by the error signal and the error is displayed on the cashier display unit 227CHR. Therefore, the cashier CHR can guess that the possibility of the customer CST on the checkout counter 210A to have done a dishonest act is high even when the cashier is effecting the accounting operation for the customer CST on the checkout counter 210B. That is, it is possible to automatically monitor without imposing mental and physical pressure. Further, the flickering display control means is operated to flicker the display content of the second display unit 252, making it easier to effect the monitoring and determining operation.

The cashier CHR asks the customer CST whether or not an article which is not scanned is contained in the articles G placed into the basket 219 on the second counter 218. However, there is more doubt, an issuance instruction is issued previously or at this time by the registered article determination receipt issuance instruction means 224K. Then, the registered article determination receipt printing/issuing control means is operated to issue the registered article determination receipt 300 on which registered article determination data is printed by the printer 226 as shown in FIG. 32 ("YES" in the steps ST237, ST238). Therefore, the cashier CHR can adequately determine occurrence of an error with definite evidence.

For example, if "27" articles G are placed in the basket 219 on the second counter 218 when the total number of articles printed on the registered article determination receipt 300 is "25", it is understood that two articles whose article names are not printed are not self-scanned. Therefore, the cashier CHR adequately and objectively gives a strict advice to the customer CST and collects the two articles G, and thus, the dishonest act can be finally prevented.

After this, the cashier CHR turns ON the determination key 240 ("YES" in the step ST239). Then, the error signal is turned out (ST240) and the accounting process is permitted (ST241, ST242).

When the permissible number A is previously set by the permissible number setting means 224S ("YES" in the step ST233) and if the number coincidence determination means determines that Nr is different from Np ("NO" in the step ST231), the difference number calculating means calculates a difference number B (B=Np−Nr) (ST234). Then, the permissible range determination means compares the difference number B with the preset permissible number A and determines whether B<A or not (ST235).

When B≧A ("YES" in the step ST235), the possibility that the dishonest act is done is extremely high, and therefore, the error signal output control means outputs an error signal (ST236) and the cashier CHR can take measures in the same manner as described above.

However, there is a case where an inexperienced customer CST feeds an article G in the article moving direction XA after the customer misunderstands that the article is correctly self-scanned, but the customer becomes aware that the self-scanning operation was effected in failure from the display content of the customer display unit 227CST, and feeds the article in the reverse direction to scan the article again. In such a case, a condition of Np>Ns occurs, but the articles G of a number corresponding to Ns may be placed on the second counter 218 in many cases.

In order to adequately treat such a customer CST of good nature, the error signal output operation inhibition control means inhibits the error signal output operation of the error signal output control means ("NO" in the step ST235) when it is determined that B<A ("NO" in the step ST235). Therefore, it becomes unnecessary to unnecessarily doubt the customer CST of good nature and give unnecessary warnings, thereby increasing the applicability.

The operations of the checkout counter 210B and ECR 220B are the same as those of the checkout counter 210A and electronic cash register 220A, and therefore, the explanation therefor is omitted.

Thus, according to the fifth embodiment, the article passage detection section 230 (231, 232), article scanning number counting means, article passage detection number counting means, number coincidence determination means, and error signal output control means are provided, the counted article scanning number Ns and the article passage detection number Np are compared with each other after completion of the self-scanning operation for one transaction, and an error signal is output if it is determined that the article scanning number Ns and the article passage detection number Np are different from each other. Therefore, the conventional problems in the practical application such as the loss of reputation of the cashier and the store due to activation of the buzzer for each article, excessive warnings to the customer CST of good nature because of doubt of the dishonest act, and reduction in the efficiency caused by the difficulty of scanning part of the purchased articles by the cashier CHR instead of the customer can be solved, occurrence of the dishonest act in one transaction can be monitored, the handling can be simplified and the applicability can be enhanced.

Further, since the article scanning number counting means counts the article scanning number Nr for the articles scanned by use of the stationary scanner 215, for example, an article such as bean curd in a container or an article having a bar code stained which is registered by the cashier CHR by use of the keyboard 224 or handy scanner 225 can also be counted. Therefore, since coincidence between the article scanning number Nr and the number of articles G actually placed into the basket 219 on the second counter 218 can be attained, an adequate operation which can be widely applied can be achieved and unnecessary warnings to the customer CST can be prevented.

Since the buzzer 255 is activated by an error signal output from the error signal output control means, the cashier CHR can monitor occurrence of the dishonest act without always watching the scanning operation by the customer CST. Particularly, the efficiency obtained in a case where one cashier CHR takes charge of the accounting operation for the two customers CST on the two checkout counters 210A, 210B can be further enhanced.

Since the article passage detection section 230 is constructed by the two sensors 231, 232 arranged in the article moving direction XA, the article scanning number Ns and the article passage detection number Np may coincide with each other because the article passage detection number Np is not counted in a case where the customer CST immediately scans the article again when becoming aware that the self-scanning operation is effected in failure. Therefore, unnecessary output of an error signal can be prevented and the treatment can be simplified.

Further, since the guidance display control means utilizing the result of detection by the article passage detection section 230 is provided, even an inexperienced customer CST can smoothly effect the self-scanning operation, and as a result, the check-out can be made quickly.

The first display control means and second display control means are provided and the counted article scanning number Ns and the article passage detection number Np are respectively displayed on the first and second display units 251 and 252 so that the cashier CHR can quantitatively monitor and determine the condition of the self-scanning operation in the middle of the self-scanning operation for one transaction without out-putting an error signal for each article. Therefore, the cashier CHR can previously detect occurrence of the dishonest act, and at the same time, the cashier can give a kind guidance to an inexperienced customer CST.

The number coincidence determining means is provided to determine coincidence for each scanning operation and the flickering display control means is provided to flicker the display of the article passage detection number Np of the second display unit 252 when it is determined that the article passage detection number Np is different from the article scanning number Nr, and therefore, the monitoring by the cashier CHR can be simplified. Also, since the display is flickered when an error signal is output, the cashier can more stably monitor the operation.

The permissible number setting means 224S, difference number calculating means, permissible range determination means and error signal output operation inhibition control means are provided and the error signal output operation of the error signal output control means is inhibited when the calculated difference number B is less than the set permissible number A. Therefore, the cashier can immediately take adequate measures for a customer CST inexperienced in the self-scanning operation or a customer CST of good nature who has made a mistake in the self-scanning operation. That is, the cashier can be prevented from unnecessarily doubting the dishonest act, giving unnecessary warnings to the customer and unwontedly delaying the accounting operation.

The permissible number setting means is constructed by the setting key 224S and a desired permissible number A can be set, thereby making it possible to effect the operation according to the actual conditions and enhancing the applicability.

Further, the registered article determination data creating means, registered article determination receipt issuance instruction means 224K, and registered article determination receipt printing/issuing control means are provided to issue a registered article determination receipt 300 in response to the issuance instruction. Therefore, whether an article which is not self-scanned is contained in the articles placed on the second counter 218 can be stably determined with evidence when an error signal is generated. Thus, there will occur no unnecessary quarrel with the customer CST.

Since the registered article determination receipt issuance instruction means is constructed by the instruction key 224K and the issuance instruction is stored in the work area of the RAM 223, the operation is simplified and the issuance instruction operation can be effected at any time, thereby enhancing the applicability.

Since the names of the registered articles, the number of registered articles and the total number are printed on the registered article determination receipt 300, occurrence of the dishonest act can be stably and rapidly determined.

There will now be described a self-scanning checkout device according to a sixth embodiment of this invention with reference to the accompanying drawings.

Figure 33:
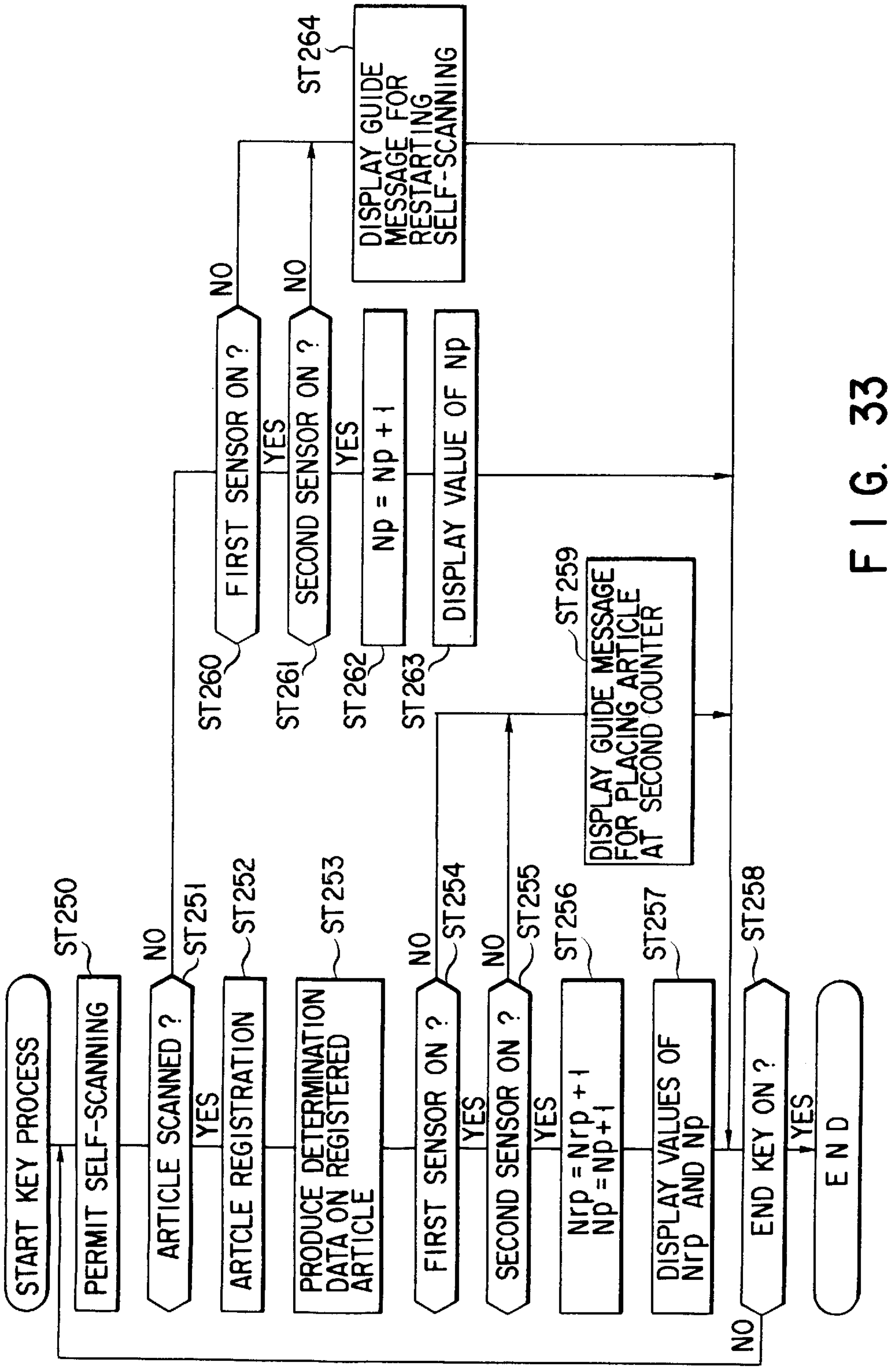
FIG. 33 is a flowchart for illustrating the operation of a self-scanning checkout device according to a sixth embodiment of this invention

The basic construction of this checkout device is the same as that of the fifth embodiment described with reference to FIGS. 27, 28, 30, 31A, 31B. In the checkout device, the process shown in FIG. 33 is effected instead of the process shown in FIG. 29 so as to prevent the dishonest act of replacing articles. Therefore, the article scanning number counting means in the fifth embodiment is replaced by scanned article passage detection number counting means.

The scanned article passage detection number counting means is obtained by executing the step ST56 shown in FIG. 33. That is, the scanned article passage detection number Nsp of articles which are self-scanned by use of the stationary scanner 215 ("YES" in the step ST251) and then detected by the article passage detection section 230 ("YES" in the steps ST254, ST255) is counted (ST256). At this time, like the fifth embodiment (ST218 in FIG. 29), the article passage detection number Np is also counted (ST256).

In FIG. 33, the steps ST250 to ST253 are the same as the steps ST210 to ST213 in FIG. 29, the steps ST254 and ST255 are the same as the steps ST216 and ST217 in FIG. 29, the steps ST258 and ST259 are the same as the steps ST221 and 220 in FIG. 29, and the steps ST60 to ST64 are the same as the steps ST22 to ST26 in FIG. 29. FIG. 30 can be applied to the sixth embodiment as it is. However, in the sixth embodiment, the scanned article passage detection number Nsp is used instead of the article scanning number Ns in the fifth embodiment.

In the fifth embodiment, since the number of times of correctly scanning articles is used as the article scanning number Ns for articles registered by the self-scanning by use of the stationary scanner 215, or the key input or scanning input by the cashier CHR, it is convenient when the cashier CHR scans the article such as bean curd in a container or an article having a bar code stained.

However, when a person of bad nature puts a first article G into the pocket after self-scanning the same, feeds a second article G which is not self-scanned towards the basket 219 on the second counter 218 via the article passage detection section 230, and places the second article on the second counter, it is difficult to automatically monitor the dishonest act of replacing the articles. This is because the article scanning number Ns and the article passage detection number Np become equal to each other in this case.

In the sixth embodiment, an article which is self-scanned and whose passage is detected is treated as an article which is correctly self-scanned. That is, the scanned article passage detection number Nsp is counted. Then, when the articles are replaced as described above, the scanned article passage detection number Nsp is not counted for the first article, but the scanned article passage detection number Nsp is counted for the second article since the passage of the second article is detected. Therefore, Nsp becomes different from Np and Np>Nsp, the dishonest act of replacing the articles can be automatically monitored and prevented.

The programs in FIG. 29 of the fifth embodiment and in FIG. 33 of the sixth embodiment can be automatically selected by the key operation.

Thus, according to the sixth embodiment, in addition to the same effect and operation as those of the fifth embodiment for automatically outputting an error signal when there is a possibility of dishonest act, the effect and operation of more completely preventing the act of replacing articles can be provided.

In the sixth embodiments, a pair of checkout counters 210A and 210B are provided, but this invention can be applied to a checkout device of one checkout counter constructed by the settlement section 220 formed of one electronic cash register 220A or 220B and one checkout counter 210A or 210B.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A self-scanning checkout apparatus comprising:

first and second article placing spaces arranged in an article moving direction;

an input section disposed between said first and second article placing spaces and including a stationary scanner for scanning an article which is held and moved in the article moving direction from said first article placing space to said second article placing space across said stationary scanner by a customer who stands in front of said input section, to read article information of the article;

a settlement section for registering the article as a sold article on the basis of the article information read by said stationary scanner;

an optical passage sensing device disposed between said first and second article placing spaces, for sensing a passage of the article held and moved by the customer; and a monitoring device for monitoring said stationary scanner and said passage sensing device to detect that the article is moved toward said second article placing space without rendering the article code thereof to be successfully read, as an abnormality in the registration by said settlement section; and wherein said stationary scanner serves as a passage sensing unit which is associated with said optical passage sensing device to confirm that movement of said article is not directed toward said first article placing space.

2. A self-scanning checkout apparatus according to claim 1, wherein:

said passage sensing device is a passage sensing unit disposed between said stationary scanner and said second article placing space; and said monitoring device includes a memory for storing an article registration flag, flag setting means for setting the article registration flag when article information of the article is read by said stationary scanner, flag checking means for checking the article registration flag when the passage of the article is sensed by said passage sensing unit, flag clearing means for clearing the article registration flag when a presence of the article registration flag is detected by said flag checking means, and an alarm unit for issuing an alarm when an absence of the article registration flag is detected by said flag checking means, said alarm indicating that the article has been moved without registration.

3. A self-scanning checkout apparatus according to claim 2, wherein said passage sensing unit includes a plurality of article sensors, arranged in the article moving direction between said stationary scanner and said second article placing space, for sequentially detecting that the article is moved from said first article placing space to said second article placing space.

4. A self-scanning checkout apparatus according to claim 1, wherein:

said passage sensing device is a passage sensing unit disposed between said stationary scanner and said first article placing space; and said monitoring device includes a memory for storing an article extraction flag, flag clearing means for clearing the article extraction flag when article information of the article is read by said stationary scanner, flag checking means for checking the article extraction flag when the passage of the article is sensed by said passage sensing unit, flag setting means for setting the article extraction flag when an absence of the article extraction flag is detected by said flag checking means, and an alarm unit for issuing an alarm when a presence of the article extraction flag is detected by said flag checking means, said alarm indicating that the previously moved article has not been registered.

5. A self-scanning checkout apparatus according to claim 1, wherein:

said passage sensing device includes a first passage sensing unit disposed between said stationary scanner and said first article placing space, and a second passage sensing unit disposed between said stationary scanner and said second article placing space; and said monitoring device includes a memory for storing an article registration flag, flag setting means for setting the article registration flag when article information of the article is read by said stationary scanner, flag clearing means for clearing the article registration flag when the passage of the article is sensed by said second passage sensing unit, flag checking means for checking the article registration flag when the passage of the article is sensed by said first passage sensing unit, and an alarm unit for issuing an alarm when a presence of the article registration flag is detected by said flag checking means, said alarm indicating that the previously moved article has not been registered.

6. A self-scanning checkout apparatus according to claim 1, wherein:

said passage sensing device includes a passage sensing unit having a pair of adjacent first and second article sensors which are arranged in the article moving direction between said stationary scanner and said second article placing space;

said first article sensor is located closer to said stationary scanner than said second article sensor each of said first and second article sensors comprises a reflection type optical detection unit which includes a combination of a light emitting element and a light receiving element; and said reflection type optical detection unit of said second article sensor is mounted on said input section such that a detection light beam emitted from the light emitting element thereof is directed toward said second article placing space.

7. A self-scanning checkout apparatus according to claim 1, wherein:

said passage sensing device includes a passage sensing unit having a pair of adjacent first and second article sensors which are arranged in the article moving direction between said stationary scanner and said second article placing space;

said first article sensor is located closer to said stationary scanner than said second article sensor;

said first article sensor comprises a single reflection type optical detection unit which includes a combination of a light emitting element and a light receiving element;

said second article sensor comprises a plurality of reflection type optical detection units each of which includes a combination of a light emitting element and a light receiving element; and said reflection type optical detection units of said second article sensor are mounted on said input section such that detection light beams emitted from the light emitting elements thereof are directed toward said second article placing space and are spread horizontally.

8. A self-scanning checkout apparatus according to claim 1, wherein:

said passage sensing device includes a passage sensing unit having a pair of adjacent first and second article sensors which are arranged in the article moving direction between said stationary scanner and said second article placing space;

said first article sensor is located closer to said stationary scanner than said second article sensor and on a customer side of said stationary scanner;

each of said first and second article sensors comprises a reflection type optical detection unit which includes a combination of a light emitting element and a light receiving element;

said reflection type optical detection unit of said first article sensor is mounted on said input section such that a detection light beam emitted from the light emitting element thereof is directed toward a space located behind said input section; and said reflection type optical detection unit of said second article sensor is mounted on said input section such that a detection light beam emitted from the light emitting element thereof is directed toward said second article placing space.

9. A self-scanning checkout apparatus comprising:

first and second article placing spaces arranged in an article moving direction;

an input section disposed between said first and second article placing spaces and including a stationary scanner for scanning an article which is held and moved in the article moving direction from said first article placing space to said second article placing space across said stationary scanner by a customer who stands in front of said input section, to read article information of the article;

a settlement section for registering the article as a sold article on the basis of the article information read by said stationary scanner;

an optical passage sensing device disposed between said first and second article placing spaces, for sensing a passage of the article held and moved by the customer; and a monitoring device for monitoring said stationary scanner and said passage sensing device to detect that the article is moved toward said second article placing space without rendering the article code thereof to be successfully read, as an abnormality in the registration by said settlement section; and wherein:

said passage sensing device includes a passage sensing unit disposed between said stationary scanner and said second article placing space;

said monitoring device includes a memory for storing an article registration flag, flag setting means for setting the article registration flag when article information of the article is read by said stationary scanner, flag checking means for checking the article registration flag when the passage of the article is sensed by said passage sensing unit, flag clearing means for clearing the article registration flag when a presence of the article registration flag is detected by said flag checking means, and an alarm unit for issuing an alarm when an absence of the article registration flag is detected by said flag checking means, said alarm indicating that the article has been moved without registration;

said passage sensing unit includes a plurality of article sensors, arranged in the article moving direction between said stationary scanner and said second article placing space, for sequentially detecting that the article is moved from said first article placing space to said second article placing space said stationary scanner serves as a passage sensing unit which is associated with said optical passage sensing device to confirm that movement of said article is not directed toward said first article placing space; and said monitoring device further includes:

read number counting means for counting a number of times that information of an article is read by said stationary scanner;

passage number counting means for counting a number of times that the passage of an article is sensed by said passage sensing unit; and a display unit for displaying counts of said read number counting means and said passage number counting means in real time.

10. A self-scanning checkout apparatus according to claim 9, wherein said display unit includes:

a cashier display for displaying the counts of said read number counting means and said passage number counting means; and a customer display for displaying the count of said read number counting means.

11. A self-scanning checkout apparatus comprising:

first and second article placing spaces arranged in an article moving direction;

an input section disposed between said first and second article placing spaces and including a stationary scanner for scanning an article which is held and moved in the article moving direction from said first article placing space to said second article placing space across said stationary scanner by a customer who stands in front of said input section, to read article information of the article;

a settlement section for registering the article as a sold article on the basis of the article information read by said stationary scanner;

an optical passage sensing device disposed between said first and second article placing spaces, for sensing a passage of the article held and moved by the customer; and a monitoring device for monitoring said stationary scanner and said passage sensing device to detect that the article is moved toward said second article placing space without rendering the article code thereof to be successfully read, as an abnormality in the registration by said settlement sections; and wherein:

said passage sensing device includes a passage sensing unit disposed between said stationary scanner and said second article placing space; and said monitoring device includes read number counting means for counting a number of times that article information of an article is read by said stationary scanner, passage number counting means for counting a number of times that the passage of an article is sensed by said passage sensing unit, comparing means for comparing a count of said read number counting means with a count of said passage number counting means to detect a difference therebetween, and signal control means responsive to detection of the difference between the counts, for causing an error signal to be generated after registration for the customer is completed.

12. A self-canning checkout apparatus according to claim 11, wherein said monitoring device further includes:

a first displaying unit for displaying one of the counts of said read number counting means and said passage number counting means; and a second displaying unit for displaying the count of said passage number counting means.

13. A self-scanning checkout apparatus according to claim 11, wherein said monitoring device further includes:

permissible number setting means for setting a permissible number; and inhibiting means for inhibiting generation of said error signal when the difference between the counts detected by said comparing means is smaller than the permissible number set by said permissible number setting means.

14. A self-scanning checkout apparatus according to claim 11, wherein said settlement section includes:

data creating means for creating registered article determination data based on article information read by said stationary scanner;

instruction means for entering an issuance instruction of a receipt having the registered article determination data printed thereon; and control means for causing a receipt to be issued in response to the issuance instruction.

15. A self-scanning checkout apparatus comprising:

first and second article placing spaces arranged in an article moving direction;

an input section disposed between said first and second article placing spaces and including a stationary scanner for scanning an article which is held and moved in the article moving direction from said first article placing space to said second article placing space across said stationary scanner by a customer who stands in front of said input section, to read article information of the article;

a settlement section for registering the article as a sold article on the basis of the article information read by said stationary scanner;

an optical passage sensing device disposed between said first and second article placing spaces, for sensing a passage of the article held and moved by the customer; and a monitoring device for monitoring said stationary scanner and said passage sensing device to detect that the article is moved toward said second article placing space without rendering the article code thereof to be successfully read, as an abnormality in the registration by said settlement section; and wherein:

said passage sensing device includes a passage sensing unit disposed between said stationary scanner and said second article placing space; and said monitoring device includes read number counting means for counting a number of times that article information of an article is read by said stationary scanner and the passage of the article is sensed by said passage sensing unit, passage number counting means for counting a number of times that the passage of an article is sensed by said passage sensing unit, comparing means for comparing a count of said read number counting means with a count of said passage number counting means to detect a difference therebetween, and signal control means responsive to detection of the difference between the counts, for causing an error signal to be generated after registration for the customer is completed.

16. A self-scanning checkout apparatus according to claim 15, wherein said monitoring device further includes:

a first displaying unit for displaying one of the counts of said read number counting means and said passage number counting means; and a second displaying unit for displaying the count of said passage number counting means.

17. A self-scanning checkout apparatus according to claim 15, wherein said monitoring device further includes:

permissible number setting means for setting a permissible number; and inhibiting means for inhibiting generation of said error signal when the difference between the counts detected by said comparing means is smaller than the permissible number set by said permissible number setting means.

18. A self-scanning checkout apparatus according to claim 15, wherein said settlement section includes:

data creating means for creating registered article determination data based on article information read by said stationary scanner;

instruction means for entering an issuance instruction of a receipt having the registered article determination data printed thereon; and control means for causing a receipt to be issued in response to the issuance instruction.

* * * * *